(12) United States Patent
Rupp et al.

(10) Patent No.: US 12,461,083 B2
(45) Date of Patent: Nov. 4, 2025

(54) METHODS FOR IMPROVED AGRICULTURAL PROCEDURES

(71) Applicant: Sabanto, Inc., Chicago, IL (US)

(72) Inventors: Craig Rupp, Ames, IA (US); Corwin Spaetti, Winthrop Harbor, IL (US); Ravi Yenduri, Rolling Meadows, IL (US); Aaron Petersdorf, Hampshire, IL (US); Adam Gaynor, Crystal Lake, IL (US)

(73) Assignee: Sabanto, Inc., Chicago, IL (US)

( * ) Notice: Subject to any disclaimer, the term of this patent is extended or adjusted under 35 U.S.C. 154(b) by 710 days.

(21) Appl. No.: 17/388,431

(22) Filed: Jul. 29, 2021

(65) Prior Publication Data

US 2022/0034859 A1 Feb. 3, 2022

Related U.S. Application Data

(60) Provisional application No. 63/060,286, filed on Aug. 3, 2020.

(51) Int. Cl.
*A01C 7/04* (2006.01)
*A01C 21/00* (2006.01)
(Continued)

(52) U.S. Cl.
CPC ........... *G01N 33/0098* (2013.01); *A01C 7/04* (2013.01); *A01C 21/00* (2013.01); *A01M 7/0089* (2013.01);
(Continued)

(58) Field of Classification Search
CPC ....... A01B 69/006; A01B 79/02; A01B 59/06; A01C 7/04; A01C 21/00; A01C 21/005; A01C 7/048; A01C 14/00; A01C 7/20; A01C 7/105; A01C 7/00; A01C 23/008; A01C 7/081; A01C 7/0443; A01C 7/10; A01C 7/201; A01D 34/008; A01M 7/0089; A01M 21/02; A01M 21/046;
(Continued)

(56) References Cited

U.S. PATENT DOCUMENTS 4,365,268 A  12/1982  Allen et al.
4,401,403 A  8/1983   Johnson et al.
(Continued)

*Primary Examiner* — Lisa M Caputo
*Assistant Examiner* — Eric Sebastian Von Wald
(74) *Attorney, Agent, or Firm* — Vander Velden Law Firm, LLC; Melinda S. Vander Velden

(57) ABSTRACT

Various apparatus and procedures for agricultural operations are provided. In particular, in one embodiment, methods for determining the precise location of each seed planted and using the seed planting location data to improve post-planting operations are provided. In another embodiment, apparatus and methods for determining the location of wet zones in an agricultural field and using the wet zone location data to plan an optimal path through the field to avoid wet areas are provided. In another embodiment, methods for tendering seed and chemical inputs for an agricultural operation are provided. In another embodiment, dynamic path planning methods of an autonomous agricultural vehicle are provided. In another embodiment, methods of planting end rows in an agricultural field are provided. In another embodiment, methods for planting multiple seed varieties in an agricultural field are provided.

4 Claims, 20 Drawing Sheets

(51) Int. Cl.
    *A01M 7/00*           (2006.01)
    *A01M 21/02*         (2006.01)
    *A01M 21/04*         (2006.01)
    *G01N 33/00*         (2006.01)

(52) U.S. Cl.
    CPC ............ *A01M 21/02* (2013.01); *A01M 21/04* (2013.01); *A01M 21/046* (2013.01)

(58) Field of Classification Search
    CPC .......... B60W 2556/50; B60Y 2200/22; G01N 33/0098; G01S 13/06; G05D 1/0278; G05D 1/0276; Y10S 111/90
    See application file for complete search history.

(56) References Cited

U.S. PATENT DOCUMENTS

| | | |
|---|---|---|
| 4,463,811 A | 8/1984 | Winter |
| 4,489,321 A | 12/1984 | Hoffa et al. |
| 4,505,094 A | 3/1985 | Demorest |
| 4,518,044 A | 5/1985 | Wiegardt et al. |
| 4,520,875 A | 6/1985 | Deckler |
| 4,528,804 A | 7/1985 | Williams |
| 4,530,405 A | 7/1985 | White |
| 4,663,918 A | 5/1987 | Williams et al. |
| 4,674,578 A | 6/1987 | Bexten et al. |
| 4,700,784 A | 10/1987 | Wiebe et al. |
| 4,713,665 A | 12/1987 | Phelan |
| 4,728,954 A | 3/1988 | Phelan et al. |
| 4,747,301 A | 5/1988 | Bellanger |
| 4,825,957 A | 5/1989 | White et al. |
| 4,837,691 A | 6/1989 | Boe et al. |
| 4,838,010 A | 6/1989 | Ziegler et al. |
| 4,969,533 A | 11/1990 | Holm et al. |
| 4,991,146 A | 2/1991 | Ransdell et al. |
| 5,060,205 A | 10/1991 | Phelan |
| 5,060,701 A | 10/1991 | McCunn et al. |
| 5,186,261 A | 2/1993 | Will et al. |
| 5,379,847 A | 1/1995 | Snyder |
| 5,524,424 A | 6/1996 | Halgrimson et al. |
| 5,658,087 A | 8/1997 | Butkovich et al. |
| 5,684,476 A | 11/1997 | Anderson |
| 5,717,403 A | 2/1998 | Nelson et al. |
| 5,764,184 A | 6/1998 | Hatch et al. |
| 5,808,582 A | 9/1998 | Woo |
| 5,870,689 A | 2/1999 | Hale et al. |
| 5,884,204 A | 3/1999 | Orbach et al. |
| 5,887,663 A | 3/1999 | Williams |
| 5,894,894 A | 4/1999 | Szymczak |
| 5,901,633 A | 5/1999 | Chan et al. |
| 5,902,343 A | 5/1999 | Hale et al. |
| 5,938,709 A | 8/1999 | Hale et al. |
| 5,947,855 A | 9/1999 | Weiss |
| 5,955,973 A | 9/1999 | Anderson |
| 5,957,304 A | 9/1999 | Dawson |
| 5,961,573 A | 10/1999 | Hale et al. |
| 5,977,778 A | 11/1999 | Chan et al. |
| 5,978,723 A | 11/1999 | Hale et al. |
| 5,991,687 A | 11/1999 | Hale et al. |
| 5,992,534 A | 11/1999 | Callies et al. |
| 5,995,895 A | 11/1999 | Watt et al. |
| 6,005,395 A | 12/1999 | Chan et al. |
| 6,038,500 A | 3/2000 | Weiss |
| 6,061,618 A | 5/2000 | Hale et al. |
| 6,070,673 A | 6/2000 | Wendte |
| 6,079,340 A * | 6/2000 | Flamme ................ A01C 7/105 111/178 |
| 6,112,139 A | 8/2000 | Schubert et al. |
| 6,125,135 A | 9/2000 | Woo et al. |
| 6,131,062 A | 10/2000 | Nielsen |
| 6,131,669 A | 10/2000 | Friggstad et al. |
| 6,141,612 A | 10/2000 | Flamme et al. |
| 6,142,059 A | 11/2000 | Chan et al. |
| 6,160,902 A | 12/2000 | Dickson et al. |
| 6,178,253 B1 | 1/2001 | Hendrickson et al. |
| 6,195,604 B1 | 2/2001 | Moore et al. |
| 6,209,656 B1 | 4/2001 | Gengler et al. |
| 6,259,401 B1 | 7/2001 | Woo |
| 6,278,918 B1 | 8/2001 | Dickson et al. |
| 6,283,222 B2 | 9/2001 | Gengler et al. |
| 6,285,930 B1 | 9/2001 | Dickson et al. |
| 6,292,729 B2 | 9/2001 | Falck et al. |
| 6,305,478 B1 | 10/2001 | Friggstad |
| 6,311,795 B1 | 11/2001 | Skotnikov et al. |
| 6,321,850 B2 | 11/2001 | Friggstad |
| 6,321,851 B1 | 11/2001 | Weiss et al. |
| 6,345,772 B1 | 2/2002 | Bastin et al. |
| 6,347,113 B1 | 2/2002 | Hatch |
| 6,378,621 B1 | 4/2002 | Graham et al. |
| 6,385,515 B1 | 5/2002 | Dickson et al. |
| 6,434,462 B1 | 8/2002 | Bevly et al. |
| 6,438,506 B1 | 8/2002 | Yohpe et al. |
| 6,445,983 B1 | 9/2002 | Dickson et al. |
| 6,490,539 B1 | 12/2002 | Dickson et al. |
| 6,529,615 B2 | 3/2003 | Hendrickson et al. |
| 6,553,299 B1 * | 4/2003 | Keller .................. A01B 79/005 56/10.2 D |
| 6,578,907 B2 | 6/2003 | Teich |
| 6,581,695 B2 | 6/2003 | Bernhardt et al. |
| 6,583,754 B2 | 6/2003 | Mertins et al. |
| 6,584,710 B1 | 7/2003 | Lin et al. |
| 6,603,803 B1 | 8/2003 | Hatch |
| 6,606,571 B2 | 8/2003 | Phelan et al. |
| 6,615,570 B2 | 9/2003 | Beck et al. |
| 6,674,687 B2 | 1/2004 | Zeitzew |
| 6,686,951 B1 | 2/2004 | Dickson et al. |
| 6,687,609 B2 | 2/2004 | Asiao et al. |
| 6,688,403 B2 | 2/2004 | Bernhardt et al. |
| 6,694,260 B1 | 2/2004 | Rekow |
| 6,697,724 B2 | 2/2004 | Beck |
| 6,698,524 B2 | 3/2004 | Bernhardt et al. |
| 6,708,080 B2 | 3/2004 | Benneweis |
| 6,714,662 B1 | 3/2004 | Benson et al. |
| 6,721,453 B1 | 4/2004 | Benson et al. |
| 6,722,994 B2 | 4/2004 | Woods et al. |
| 6,728,607 B1 | 4/2004 | Anderson |
| 6,753,810 B1 | 6/2004 | Yang et al. |
| 6,760,654 B2 | 7/2004 | Beck |
| 6,763,619 B2 | 7/2004 | Hendron et al. |
| 6,769,349 B2 | 8/2004 | Arshad et al. |
| 6,778,894 B2 | 8/2004 | Beck et al. |
| 6,779,623 B2 | 8/2004 | Woods et al. |
| 6,789,014 B1 | 9/2004 | Rekow et al. |
| 6,813,557 B2 | 11/2004 | Schmidt et al. |
| 6,819,780 B2 | 11/2004 | Benson et al. |
| 6,820,699 B1 | 11/2004 | Bettin |
| 6,823,249 B2 | 11/2004 | Moore et al. |
| 6,839,127 B1 | 1/2005 | Anderson |
| 6,839,616 B2 | 1/2005 | Beck |
| 6,864,836 B1 | 3/2005 | Hatch et al. |
| 6,901,319 B1 | 5/2005 | Nelson et al. |
| 6,904,985 B2 | 6/2005 | Ferree et al. |
| 6,907,336 B2 | 6/2005 | Gray et al. |
| 6,915,873 B2 | 7/2005 | Woods et al. |
| 6,934,615 B2 | 8/2005 | Flann et al. |
| 6,934,632 B2 | 8/2005 | Hatch |
| 6,941,208 B2 | 9/2005 | Mahoney et al. |
| 6,942,041 B1 | 9/2005 | Kraus et al. |
| 6,946,749 B2 | 9/2005 | Turner |
| 6,948,784 B2 | 9/2005 | Wodrich et al. |
| 6,963,881 B2 | 11/2005 | Pickett et al. |
| 6,980,895 B2 | 12/2005 | Paice et al. |
| 6,990,399 B2 | 1/2006 | Hrazdera et al. |
| 6,999,877 B1 | 2/2006 | Dyer et al. |
| 7,010,425 B2 | 3/2006 | Gray et al. |
| 7,026,992 B1 | 4/2006 | Hunt et al. |
| 7,047,133 B1 | 5/2006 | Dyer et al. |
| 7,047,135 B2 | 5/2006 | Dyer et al. |
| 7,062,381 B1 | 6/2006 | Rekow et al. |
| 7,064,810 B2 | 6/2006 | Anderson et al. |
| 7,071,870 B2 | 7/2006 | Sharpe et al. |
| 7,073,314 B2 | 7/2006 | Beck et al. |
| 7,073,603 B2 | 7/2006 | Nordhoff |
| 7,079,943 B2 | 7/2006 | Flann et al. |

(56) References Cited

U.S. PATENT DOCUMENTS

| | | |
|---|---|---|
| 7,082,361 B2 | 7/2006 | Berger et al. |
| 7,110,881 B2 | 9/2006 | Gray et al. |
| 7,117,417 B2 | 10/2006 | Sharpe et al. |
| 7,119,741 B2 | 10/2006 | Sharpe et al. |
| 7,142,150 B2 | 11/2006 | Thackray |
| 7,167,797 B2 | 1/2007 | Faivre et al. |
| 7,184,892 B1 | 2/2007 | Dyer et al. |
| 7,206,063 B2 | 4/2007 | Anderson et al. |
| 7,212,155 B2 | 5/2007 | Hatch et al. |
| 7,216,033 B2 | 5/2007 | Flann et al. |
| 7,228,214 B2 | 6/2007 | Flann et al. |
| 7,231,295 B2 | 6/2007 | Pickett et al. |
| 7,242,791 B2 | 7/2007 | Han et al. |
| 7,248,211 B2 | 7/2007 | Hatch et al. |
| 7,250,901 B2 | 7/2007 | Stephens |
| 7,254,485 B2 | 8/2007 | Rooney et al. |
| 7,266,477 B2 | 9/2007 | Foessel |
| 7,277,784 B2 | 10/2007 | Weiss |
| 7,283,900 B1 | 10/2007 | Gacioch, Jr. et al. |
| 7,286,624 B2 | 10/2007 | Rentz et al. |
| 7,299,056 B2 | 11/2007 | Anderson |
| 7,313,478 B1 | 12/2007 | Anderson et al. |
| 7,315,275 B2 | 1/2008 | Stephens |
| 7,349,779 B2 | 3/2008 | Nelson |
| 7,350,343 B2 | 4/2008 | Beck |
| 7,353,885 B2 | 4/2008 | Nordhoff |
| 7,385,551 B2 | 6/2008 | Stephens |
| 7,397,392 B2 | 7/2008 | Mahoney et al. |
| 7,400,957 B2 | 7/2008 | Hofer et al. |
| 7,403,846 B2 | 7/2008 | Maertens et al. |
| 7,419,345 B2 | 9/2008 | Priepke |
| 7,427,945 B2 | 9/2008 | Stephens |
| 7,427,950 B2 | 9/2008 | Eslinger et al. |
| 7,450,080 B2 | 11/2008 | Stephens |
| 7,453,925 B2 | 11/2008 | Keegan et al. |
| 7,466,262 B2 | 12/2008 | Stephens |
| 7,479,922 B2 | 1/2009 | Hunt et al. |
| 7,480,564 B2 | 1/2009 | Metzler et al. |
| 7,503,510 B2 | 3/2009 | Vickers et al. |
| 7,505,848 B2 | 3/2009 | Flann et al. |
| 7,509,199 B2 | 3/2009 | Rekow |
| 7,511,661 B2 | 3/2009 | Hatch et al. |
| 7,544,125 B2 | 6/2009 | Smith |
| 7,580,783 B2 | 8/2009 | Dix |
| 7,591,226 B2 | 9/2009 | Dix et al. |
| 7,593,798 B2 | 9/2009 | Han et al. |
| 7,593,811 B2 | 9/2009 | Schmidt et al. |
| 7,610,122 B2 | 10/2009 | Anderson |
| 7,610,123 B2 | 10/2009 | Han et al. |
| 7,633,437 B2 | 12/2009 | Hatch |
| 7,644,780 B2 | 1/2010 | Harnetiaux et al. |
| 7,645,190 B2 | 1/2010 | Schwinn et al. |
| 7,647,177 B2 | 1/2010 | Schmidt et al. |
| 7,650,734 B2 | 1/2010 | Beck et al. |
| 7,652,618 B2 | 1/2010 | Kearney et al. |
| 7,653,483 B2 | 1/2010 | Schmidt et al. |
| 7,679,555 B2 | 3/2010 | Dai et al. |
| 7,689,356 B2 | 3/2010 | Dix et al. |
| 7,706,948 B2 | 4/2010 | Dix et al. |
| 7,715,966 B2 | 5/2010 | Dix et al. |
| 7,715,979 B2 | 5/2010 | Dix |
| 7,720,598 B2 | 5/2010 | Schmidt et al. |
| 7,721,516 B2 | 5/2010 | Wendling |
| 7,725,113 B2 | 5/2010 | Fiedelak et al. |
| 7,729,830 B2 | 6/2010 | Tarasinski et al. |
| 7,748,147 B2 | 7/2010 | Schoenmaker et al. |
| 7,748,488 B2 | 7/2010 | Tarasinski et al. |
| 7,752,778 B2 | 7/2010 | Schoenmaker et al. |
| 7,752,779 B2 | 7/2010 | Schoenmaker et al. |
| 7,756,623 B2 | 7/2010 | Jarrett et al. |
| 7,779,616 B2 | 8/2010 | Sheidler et al. |
| 7,788,889 B2 | 9/2010 | Sheidler |
| 7,797,860 B2 | 9/2010 | Schoenmaker et al. |
| 7,801,481 B2 | 9/2010 | Knight |
| 7,832,223 B2 | 11/2010 | Arshad et al. |
| 7,844,380 B2 | 11/2010 | Han et al. |
| 7,844,396 B2 | 11/2010 | Zeitzew |
| 7,849,932 B2 | 12/2010 | Friggstad et al. |
| 7,857,237 B2 | 12/2010 | Vickers et al. |
| 7,860,145 B2 | 12/2010 | Knight et al. |
| 7,861,794 B2 | 1/2011 | Tarasinski et al. |
| 7,877,182 B2 | 1/2011 | Dix et al. |
| 7,894,951 B2 | 2/2011 | Norris et al. |
| 7,904,226 B2 | 3/2011 | Dix |
| 7,905,297 B2 | 3/2011 | Fox et al. |
| 7,912,158 B2 | 3/2011 | Cahn et al. |
| 7,916,898 B2 | 3/2011 | Anderson |
| 7,938,613 B2 | 5/2011 | Yoder et al. |
| 7,957,850 B2 | 6/2011 | Anderson |
| 7,961,141 B2 | 6/2011 | Dai et al. |
| 7,961,143 B2 | 6/2011 | Dai et al. |
| 8,020,657 B2 | 9/2011 | Allard et al. |
| 8,028,499 B2 | 10/2011 | Viaud |
| 8,035,552 B2 | 10/2011 | Dai et al. |
| 8,060,269 B2 | 11/2011 | Dix |
| 8,060,306 B2 | 11/2011 | Puhalla et al. |
| 8,074,754 B2 | 12/2011 | Gouker |
| 8,090,514 B2 | 1/2012 | Tarasinski et al. |
| 8,112,202 B2 | 2/2012 | Fackler et al. |
| 8,126,620 B2 | 2/2012 | Ringwald et al. |
| 8,131,432 B2 | 3/2012 | Senneff et al. |
| 8,145,390 B2 | 3/2012 | Dix et al. |
| 8,150,574 B2 | 4/2012 | Han et al. |
| 8,160,765 B2 | 4/2012 | Morselli et al. |
| 8,186,449 B2 | 5/2012 | Hackert et al. |
| 8,190,364 B2 | 5/2012 | Rekow |
| 8,195,342 B2 | 6/2012 | Anderson |
| 8,195,364 B2 | 6/2012 | Norris et al. |
| 8,209,075 B2 | 6/2012 | Senneff et al. |
| 8,209,095 B2 | 6/2012 | Mackin et al. |
| 8,224,516 B2 | 7/2012 | Anderson |
| 8,229,618 B2 | 7/2012 | Tolstedt et al. |
| 8,234,010 B2 | 7/2012 | Thompson et al. |
| 8,242,953 B2 | 8/2012 | Dai et al. |
| 8,243,772 B2 | 8/2012 | Knight et al. |
| 8,260,499 B2 | 9/2012 | Boydell |
| 8,280,590 B2 | 10/2012 | Mackin et al. |
| 8,280,595 B2 | 10/2012 | Foster et al. |
| 8,296,052 B2 | 10/2012 | Dix et al. |
| 8,306,699 B2 | 11/2012 | Scheer |
| 8,306,727 B2 | 11/2012 | Morselli et al. |
| 8,335,653 B2 | 12/2012 | Pruett et al. |
| 8,340,438 B2 | 12/2012 | Anderson |
| 8,342,255 B2 | 1/2013 | Connors et al. |
| 8,346,443 B2 | 1/2013 | Senneff et al. |
| 8,359,139 B2 | 1/2013 | Wang et al. |
| 8,364,366 B2 | 1/2013 | Foessel et al. |
| 8,365,679 B2 | 2/2013 | Andphair et al. |
| 8,366,372 B2 | 2/2013 | Yoder et al. |
| 8,392,065 B2 | 3/2013 | Tolstedt et al. |
| 8,401,743 B2 | 3/2013 | Harber et al. |
| 8,407,157 B2 | 3/2013 | Anderson |
| 8,408,149 B2 | 4/2013 | Rylander |
| 8,416,133 B2 | 4/2013 | Hatch et al. |
| 8,427,365 B2 | 4/2013 | Dai et al. |
| 8,433,483 B2 | 4/2013 | Han et al. |
| 8,437,901 B2 | 5/2013 | Anderson |
| 8,442,700 B2 | 5/2013 | Anderson |
| 8,456,353 B2 | 6/2013 | Dai et al. |
| 8,473,140 B2 | 6/2013 | Norris et al. |
| 8,478,493 B2 | 7/2013 | Anderson |
| 8,490,371 B2 | 7/2013 | Roberge |
| 8,498,786 B2 | 7/2013 | Anderson |
| 8,498,796 B2 | 7/2013 | Norris et al. |
| 8,500,387 B2 | 8/2013 | Trifunovic |
| 8,505,808 B2 | 8/2013 | Peterson et al. |
| 8,510,034 B2 | 8/2013 | Norris et al. |
| 8,522,756 B2 | 9/2013 | Vuk et al. |
| 8,544,964 B2 | 10/2013 | Rekow et al. |
| 8,560,145 B2 | 10/2013 | Anderson |
| 8,567,551 B2 | 10/2013 | Trifunovic |
| 8,573,337 B1 | 11/2013 | Luoma et al. |
| 8,576,056 B2 | 11/2013 | Clair et al. |
| 8,577,558 B2 | 11/2013 | Mitchell |

(56) References Cited

U.S. PATENT DOCUMENTS

| | | |
|---|---|---|
| 8,583,312 B2 | 11/2013 | Schreiber |
| 8,599,027 B2 | 12/2013 | Sanchez |
| 8,602,135 B2 | 12/2013 | Kraus |
| 8,626,390 B2 | 1/2014 | Prickel et al. |
| 8,626,441 B2 | 1/2014 | Matthews |
| 8,635,011 B2 | 1/2014 | Senneff et al. |
| 8,635,015 B2 | 1/2014 | Anderson |
| 8,640,785 B2 | 2/2014 | Diaz et al. |
| 8,649,940 B2 | 2/2014 | Bonefas |
| 8,659,474 B2 | 2/2014 | Dai et al. |
| 8,660,724 B2 | 2/2014 | Tarasinski et al. |
| 8,665,145 B2 | 3/2014 | Dai et al. |
| 8,666,554 B2 | 3/2014 | Anderson |
| 8,682,573 B2 | 3/2014 | Anderson |
| 8,694,382 B2 | 4/2014 | Aznavorian et al. |
| 8,700,263 B2 | 4/2014 | Matthews |
| 8,712,144 B2 | 4/2014 | Mas et al. |
| 8,731,826 B2 | 5/2014 | Matthews |
| 8,737,720 B2 | 5/2014 | Mas et al. |
| 8,738,238 B2 | 5/2014 | Rekow |
| 8,744,626 B2 | 6/2014 | Johnson et al. |
| 8,755,974 B2 | 6/2014 | Matthews |
| 8,766,848 B2 | 7/2014 | Dai et al. |
| 8,789,563 B2 | 7/2014 | Wenzel |
| 8,803,736 B2 | 8/2014 | Dai et al. |
| 8,818,567 B2 | 8/2014 | Anderson |
| 8,820,039 B2 | 9/2014 | Werning |
| 8,825,294 B2 | 9/2014 | Norris et al. |
| 8,825,310 B2 | 9/2014 | Kowalchuk |
| 8,825,311 B2 | 9/2014 | Kowalchuk |
| 8,827,001 B2 | 9/2014 | Wendte et al. |
| 8,840,357 B2 | 9/2014 | Anderson |
| 8,843,269 B2 | 9/2014 | Anderson et al. |
| 8,855,405 B2 | 10/2014 | Mas et al. |
| 8,868,304 B2 | 10/2014 | Bonefas |
| 8,874,261 B2 | 10/2014 | Hein et al. |
| 8,874,300 B2 | 10/2014 | Allard et al. |
| 8,909,389 B2 | 12/2014 | Meyer |
| 8,914,198 B2 | 12/2014 | Prickel et al. |
| 8,930,095 B2 | 1/2015 | Anderson |
| 8,931,245 B2 | 1/2015 | Roberge |
| 8,939,250 B2 | 1/2015 | Turner et al. |
| 8,942,157 B2 | 1/2015 | Keegan |
| 8,942,860 B2 | 1/2015 | Morselli |
| 8,942,897 B2 | 1/2015 | Foster et al. |
| 8,948,974 B2 | 2/2015 | Montocchio |
| 8,948,975 B2 | 2/2015 | Peterson et al. |
| 8,983,685 B2 | 3/2015 | Dai et al. |
| 8,989,946 B2 | 3/2015 | Anderson |
| 8,989,972 B2 | 3/2015 | Anderson |
| 8,991,274 B2 | 3/2015 | Tuttle |
| 8,996,171 B2 | 3/2015 | Anderson et al. |
| 9,002,591 B2 | 4/2015 | Wang et al. |
| 9,008,918 B2 | 4/2015 | Missotten et al. |
| 9,014,901 B2 | 4/2015 | Wang et al. |
| 9,026,315 B2 | 5/2015 | Anderson |
| 9,036,682 B2 | 5/2015 | Keegan et al. |
| 9,038,755 B2 | 5/2015 | Sedoni et al. |
| 9,043,016 B2 | 5/2015 | Filippov et al. |
| 9,043,078 B2 | 5/2015 | Johnson et al. |
| 9,043,129 B2 | 5/2015 | Bonefas et al. |
| 9,043,951 B2 * | 6/2015 | Tolstedt ............... A01C 21/005 |
| 9,048,964 B2 | 6/2015 | Keegan et al. |
| 9,066,464 B2 | 6/2015 | Schmidt et al. |
| 9,066,465 B2 | 6/2015 | Hendrickson et al. |
| 9,072,213 B2 | 7/2015 | Connell et al. |
| 9,072,227 B2 | 7/2015 | Wenzel |
| 9,079,482 B2 | 7/2015 | Besler et al. |
| 9,085,203 B2 | 7/2015 | Duppong et al. |
| 9,086,699 B2 | 7/2015 | Pirotais |
| 9,096,264 B2 | 8/2015 | Connors et al. |
| 9,098,080 B2 | 8/2015 | Norris et al. |
| 9,098,085 B2 | 8/2015 | Aznavorian et al. |
| 9,101,090 B2 | 8/2015 | Pierce et al. |
| 9,113,588 B2 | 8/2015 | Kormann |
| 9,114,822 B2 | 8/2015 | Prickel et al. |
| 9,114,832 B2 | 8/2015 | Wang et al. |
| 9,119,342 B2 | 9/2015 | Bonefas |
| 9,139,222 B2 | 9/2015 | Potter et al. |
| 9,150,104 B2 | 10/2015 | Kellum |
| 9,169,973 B2 | 10/2015 | Nickel |
| 9,180,889 B2 | 11/2015 | Upchurch et al. |
| 9,184,973 B2 | 11/2015 | Yu et al. |
| 9,188,980 B2 | 11/2015 | Anderson |
| 9,194,936 B1 | 11/2015 | Keegan |
| 9,196,100 B1 | 11/2015 | Kilworth et al. |
| 9,197,285 B2 | 11/2015 | Yu |
| 9,227,474 B2 | 1/2016 | Liu |
| 9,232,688 B2 | 1/2016 | Kormann et al. |
| 9,235,214 B2 | 1/2016 | Anderson |
| 9,242,671 B2 | 1/2016 | Potter et al. |
| 9,261,576 B2 | 2/2016 | Keegan et al. |
| 9,265,194 B2 | 2/2016 | Mangen et al. |
| 9,269,200 B2 | 2/2016 | Schmidt |
| 9,274,524 B2 | 3/2016 | Anderson |
| 9,282,693 B2 | 3/2016 | Anderson |
| 9,290,093 B2 | 3/2016 | Turner et al. |
| 9,296,411 B2 | 3/2016 | Hornberger |
| 9,301,446 B2 | 4/2016 | Peters et al. |
| 9,303,998 B2 | 4/2016 | Schmidt |
| 9,310,464 B2 | 4/2016 | Keegan |
| 9,313,944 B1 | 4/2016 | Faivre et al. |
| 9,313,951 B2 | 4/2016 | Herman et al. |
| 9,320,196 B2 | 4/2016 | Dybro et al. |
| 9,320,197 B2 | 4/2016 | Peters et al. |
| 9,326,443 B2 | 5/2016 | Zametzer et al. |
| 9,326,444 B2 | 5/2016 | Bonefas |
| 9,329,078 B1 | 5/2016 | Mundhenke et al. |
| 9,345,194 B2 | 5/2016 | Schroeder et al. |
| 9,357,759 B2 | 6/2016 | Anderson |
| 9,357,760 B2 | 6/2016 | Anderson |
| 9,370,138 B2 | 6/2016 | Bebernes et al. |
| 9,374,939 B2 | 6/2016 | Pickett et al. |
| 9,379,765 B2 | 6/2016 | Yu et al. |
| 9,380,737 B2 | 7/2016 | Bebernes et al. |
| 9,383,430 B2 | 7/2016 | Keegan |
| 9,386,738 B2 | 7/2016 | Peterson et al. |
| 9,392,746 B2 | 7/2016 | Darr et al. |
| 9,396,153 B2 | 7/2016 | Peters et al. |
| 9,405,039 B2 | 8/2016 | Anderson |
| 9,415,953 B2 | 8/2016 | Bonefas |
| 9,429,944 B2 | 8/2016 | Filippov et al. |
| 9,438,991 B2 | 9/2016 | Sanchez et al. |
| 9,439,341 B2 | 9/2016 | Bebernes et al. |
| 9,445,546 B2 | 9/2016 | May |
| 9,452,702 B2 | 9/2016 | Stander et al. |
| 9,457,841 B2 | 10/2016 | Smith et al. |
| 9,457,971 B2 | 10/2016 | Bonefas et al. |
| 9,462,748 B2 | 10/2016 | Dollinger et al. |
| 9,463,939 B2 | 10/2016 | Bonefas et al. |
| 9,468,145 B2 | 10/2016 | Coppinger et al. |
| 9,482,740 B2 | 11/2016 | Keegan |
| 9,485,914 B2 | 11/2016 | Schleicher et al. |
| 9,510,508 B2 | 12/2016 | Jung |
| 9,511,633 B2 | 12/2016 | Anderson et al. |
| 9,511,958 B2 | 12/2016 | Bonefas |
| 9,513,932 B2 | 12/2016 | Andersen et al. |
| 9,516,802 B2 | 12/2016 | Zemenchik |
| 9,522,791 B2 | 12/2016 | Bonefas et al. |
| 9,522,792 B2 | 12/2016 | Bonefas et al. |
| 9,523,180 B2 | 12/2016 | Deines |
| 9,526,211 B2 | 12/2016 | Murray et al. |
| 9,527,211 B2 | 12/2016 | Posselius et al. |
| 9,529,364 B2 | 12/2016 | Foster et al. |
| 9,532,499 B2 | 1/2017 | Anderson et al. |
| 9,541,648 B2 | 1/2017 | Ralphs et al. |
| 9,545,048 B2 | 1/2017 | Pickett et al. |
| 9,550,527 B2 | 1/2017 | Brooks |
| 9,554,499 B2 | 1/2017 | Müller et al. |
| 9,558,600 B2 | 1/2017 | Rice et al. |
| 9,563,492 B2 | 2/2017 | Bell et al. |
| 9,565,802 B2 | 2/2017 | Schleicher |
| 9,573,583 B2 | 2/2017 | Rindfleisch et al. |
| 9,581,691 B2 | 2/2017 | Simicevic et al. |

(56) References Cited

U.S. PATENT DOCUMENTS

| | | |
|---|---|---|
| 9,599,721 B2 | 3/2017 | Pai et al. |
| 9,615,501 B2 | 4/2017 | Pickett et al. |
| 9,633,491 B2 | 4/2017 | Wonderlich |
| 9,635,798 B2 | 5/2017 | Merx et al. |
| 9,641,962 B2 | 5/2017 | Kilworth et al. |
| 9,645,006 B2 | 5/2017 | Phelan et al. |
| 9,646,430 B2 | 5/2017 | Runde |
| 9,668,400 B2 | 6/2017 | Follmer |
| 9,668,420 B2 | 6/2017 | Anderson et al. |
| 9,675,008 B1 | 6/2017 | Rusciolelli et al. |
| 9,693,503 B2 | 7/2017 | Dybro et al. |
| 9,696,162 B2 | 7/2017 | Anderson |
| 9,699,968 B2 | 7/2017 | Posselius et al. |
| 9,706,698 B2 | 7/2017 | Kinder et al. |
| 9,709,969 B2 | 7/2017 | Anderson et al. |
| 9,716,926 B2 | 7/2017 | Johnson et al. |
| 9,717,172 B2 | 8/2017 | Johnson et al. |
| 9,718,507 B2 | 8/2017 | Ricketts et al. |
| 9,740,208 B2 | 8/2017 | Sugumaran et al. |
| 9,750,173 B2 | 9/2017 | Dix et al. |
| 9,765,690 B2 | 9/2017 | Ritter et al. |
| 9,771,079 B2 | 9/2017 | Omran et al. |
| 9,772,625 B2 | 9/2017 | Gilmore et al. |
| 9,791,863 B2 | 10/2017 | Derscheid et al. |
| 9,795,074 B2 | 10/2017 | Stratton et al. |
| 9,801,331 B2 | 10/2017 | Foster et al. |
| 9,801,332 B2 | 10/2017 | Landphair et al. |
| 9,803,324 B2 | 10/2017 | Kean et al. |
| 9,807,931 B2 | 11/2017 | Corbett et al. |
| 9,807,932 B2 | 11/2017 | French, Jr. et al. |
| 9,807,934 B2 | 11/2017 | Rusciolelli et al. |
| 9,811,087 B2 | 11/2017 | Nelson et al. |
| 9,819,925 B2 | 11/2017 | Posselius et al. |
| 9,821,847 B2 | 11/2017 | Robinson et al. |
| 9,826,673 B1 | 11/2017 | Ray et al. |
| 9,826,674 B2 | 11/2017 | Matthews |
| 9,832,928 B2 | 12/2017 | Dybro et al. |
| 9,832,930 B2 | 12/2017 | Herron |
| 9,834,248 B2 | 12/2017 | Nelson et al. |
| 9,846,241 B2 | 12/2017 | Dai et al. |
| 9,848,528 B2 | 12/2017 | Werner et al. |
| 9,849,828 B2 | 12/2017 | Foster et al. |
| 9,849,909 B2 | 12/2017 | Wang et al. |
| 9,854,725 B2 | 1/2018 | Gunlogson et al. |
| 9,861,024 B2 | 1/2018 | Vogler et al. |
| 9,861,040 B2 | 1/2018 | Bonefas |
| 9,867,325 B2 | 1/2018 | Clifford et al. |
| 9,867,334 B2 | 1/2018 | Jongmans et al. |
| 9,872,428 B2 | 1/2018 | Bernier et al. |
| 9,873,449 B2 | 1/2018 | Magisson et al. |
| 9,877,426 B2 | 1/2018 | Mangen et al. |
| 9,880,535 B2 | 1/2018 | Henry |
| 9,880,559 B2 | 1/2018 | Putkonen et al. |
| 9,880,560 B2 | 1/2018 | Han et al. |
| 9,891,629 B2 | 2/2018 | Murray et al. |
| 9,901,021 B2 | 2/2018 | Phan et al. |
| 9,903,947 B2 | 2/2018 | Das et al. |
| 9,903,979 B2 | 2/2018 | Dybro et al. |
| 9,904,290 B2 | 2/2018 | Pickett et al. |
| 9,915,952 B2 | 3/2018 | Dollinger et al. |
| 9,921,064 B2 | 3/2018 | Schleicher |
| 9,927,242 B2 | 3/2018 | Schleicher |
| 9,930,824 B2 | 4/2018 | Nafziger et al. |
| 9,932,043 B2 | 4/2018 | Chaston et al. |
| 9,949,423 B2 | 4/2018 | Foster et al. |
| 9,950,734 B2 | 4/2018 | Bebernes et al. |
| 9,952,596 B2 | 4/2018 | Foster et al. |
| 9,968,023 B2 | 5/2018 | Brooks et al. |
| 9,968,025 B2 | 5/2018 | Bunderson et al. |
| 9,973,710 B2 | 5/2018 | Boydens et al. |
| 9,974,225 B2 | 5/2018 | Bunderson et al. |
| 9,983,589 B2 | 5/2018 | Foster et al. |
| 9,989,636 B2 | 6/2018 | Sherlock |
| 9,989,835 B1 | 6/2018 | Gomez et al. |
| 9,992,932 B2 | 6/2018 | Bonefas et al. |
| 9,994,264 B2 | 6/2018 | Salvini |
| 10,005,500 B2 | 6/2018 | Huenemann et al. |
| 10,010,021 B2 | 7/2018 | Foster et al. |
| 10,018,171 B1 | 7/2018 | Breiner et al. |
| 10,028,424 B2 | 7/2018 | Zemenchik et al. |
| 10,031,525 B2 | 7/2018 | Dix et al. |
| 10,034,425 B2 | 7/2018 | Ducroquet et al. |
| 10,037,630 B2 | 7/2018 | So et al. |
| 10,037,634 B2 | 7/2018 | Christofferson et al. |
| 10,039,231 B2 | 8/2018 | Anderson et al. |
| 10,039,234 B2 | 8/2018 | Missotten et al. |
| 10,040,327 B2 | 8/2018 | Chmelar et al. |
| 10,048,385 B2 | 8/2018 | Yu et al. |
| 10,051,774 B2 | 8/2018 | Henry et al. |
| 10,053,100 B2 | 8/2018 | Foster et al. |
| 10,053,146 B2 | 8/2018 | Morselli et al. |
| 10,064,333 B2 | 9/2018 | Duquesne et al. |
| 10,072,385 B2 | 9/2018 | Kean et al. |
| 10,073,457 B2 | 9/2018 | Foster et al. |
| 10,080,325 B2 | 9/2018 | Weisberg et al. |
| 10,085,371 B2 | 10/2018 | Sudbrink et al. |
| 10,088,842 B2 | 10/2018 | Schmidt et al. |
| 10,091,929 B2 | 10/2018 | Henry et al. |
| 10,094,470 B2 | 10/2018 | Omran et al. |
| 10,095,235 B2 | 10/2018 | Sugumaran et al. |
| 10,096,174 B2 | 10/2018 | Watson et al. |
| 10,096,179 B2 | 10/2018 | Runde |
| 10,102,690 B2 | 10/2018 | Bell et al. |
| 10,102,693 B1 | 10/2018 | Wu |
| 10,111,386 B2 | 10/2018 | Farley et al. |
| 10,114,348 B2 | 10/2018 | Gilmore et al. |
| 10,114,378 B2 | 10/2018 | Korthals et al. |
| 10,117,374 B2 | 11/2018 | Boydens et al. |
| 10,119,244 B2 | 11/2018 | Elkins |
| 10,123,475 B2 | 11/2018 | Posselius et al. |
| 10,124,827 B2 | 11/2018 | NyKamp et al. |
| 10,126,282 B2 | 11/2018 | Anderson et al. |
| 10,132,259 B1 | 11/2018 | Watson et al. |
| 10,139,234 B2 | 11/2018 | Matthews |
| 10,143,126 B2 | 12/2018 | Foster et al. |
| 10,144,390 B1 | 12/2018 | Chaston et al. |
| 10,144,453 B2 | 12/2018 | Bunderson et al. |
| 10,150,483 B2 | 12/2018 | Procuniar et al. |
| 10,152,891 B2 | 12/2018 | Rusciolelli et al. |
| 10,153,543 B2 | 12/2018 | Foster et al. |
| 10,159,177 B2 | 12/2018 | Gervais et al. |
| 10,165,722 B2 | 1/2019 | Ackerman et al. |
| 10,165,725 B2 | 1/2019 | Sugumaran et al. |
| 10,172,274 B2 | 1/2019 | Connell et al. |
| 10,178,828 B2 | 1/2019 | Hendrickson et al. |
| 10,179,604 B2 | 1/2019 | Rotole et al. |
| 10,179,606 B2 | 1/2019 | Bebernes et al. |
| 10,180,328 B2 | 1/2019 | Matthews |
| 10,183,667 B2 | 1/2019 | Anderson et al. |
| 10,185,317 B2 | 1/2019 | Pichlmaier et al. |
| 10,188,021 B2 | 1/2019 | Foster et al. |
| 10,188,024 B2 | 1/2019 | Rusciolelli et al. |
| 10,188,037 B2 | 1/2019 | Bruns et al. |
| 10,191,157 B2 | 1/2019 | Pai et al. |
| 10,194,575 B2 | 2/2019 | Schmidt |
| 10,194,578 B2 | 2/2019 | Williams |
| 10,194,581 B2 | 2/2019 | Mangen et al. |
| 10,194,585 B2 | 2/2019 | Aesaert et al. |
| 10,201,022 B2 | 2/2019 | Matthews |
| 10,207,689 B2 | 2/2019 | Mueller et al. |
| 10,207,735 B2 | 2/2019 | Bebernes et al. |
| 10,212,874 B2 | 2/2019 | Matthews |
| 10,217,066 B1 | 2/2019 | Margherio et al. |
| 10,219,422 B2 | 3/2019 | Buhler et al. |
| 10,222,483 B2 | 3/2019 | Dai et al. |
| 10,222,484 B2 | 3/2019 | Dai et al. |
| 10,225,978 B2 | 3/2019 | Schoeny et al. |
| 10,225,979 B2 | 3/2019 | Trask |
| 10,231,376 B1 | 3/2019 | Stanhope et al. |
| 10,234,368 B2 | 3/2019 | Cherney |
| 10,234,837 B2 | 3/2019 | French, Jr. |
| 10,241,209 B2 | 3/2019 | Feldhaus et al. |
| 10,245,915 B2 | 4/2019 | Kerner et al. |
| 10,251,329 B2 | 4/2019 | Foster et al. |

(56) References Cited

U.S. PATENT DOCUMENTS

| | | |
|---|---|---|
| 10,252,285 B2 | 4/2019 | Barker et al. |
| 10,254,147 B2 | 4/2019 | Vermue et al. |
| 10,254,765 B2 | 4/2019 | Rekow |
| 10,262,411 B2 | 4/2019 | Kean |
| 10,276,037 B2 | 4/2019 | Meiners |
| 10,281,905 B2 | 5/2019 | French, Jr. |
| 10,286,893 B2 | 5/2019 | Woopen et al. |
| 10,292,323 B2 | 5/2019 | Missotten et al. |
| 10,295,703 B2 | 5/2019 | Dybro et al. |
| 10,299,422 B2 | 5/2019 | Schleicher et al. |
| 10,310,455 B2 | 6/2019 | Blank et al. |
| 10,314,224 B2 | 6/2019 | Turpin et al. |
| 10,315,655 B2 | 6/2019 | Blank et al. |
| 10,318,609 B2 | 6/2019 | Blank et al. |
| 10,338,232 B2 | 7/2019 | Zhang et al. |
| 10,342,173 B2 | 7/2019 | Heinrich et al. |
| 10,351,364 B2 | 7/2019 | Green et al. |
| 10,352,255 B2 | 7/2019 | Pipho et al. |
| 10,369,872 B2 | 8/2019 | Jackson |
| 10,371,558 B2 | 8/2019 | Tevs et al. |
| 10,372,126 B2 | 8/2019 | Foster et al. |
| 10,379,225 B2 | 8/2019 | Dai et al. |
| 10,380,808 B2 | 8/2019 | Sherlock |
| 10,380,811 B1 | 8/2019 | Stuart et al. |
| 10,386,496 B2 | 8/2019 | Dai et al. |
| 10,386,844 B2 | 8/2019 | Wilcox et al. |
| 10,390,472 B2 | 8/2019 | Matthews |
| 10,390,474 B2 | 8/2019 | Kelley et al. |
| 10,392,016 B2 | 8/2019 | Gorczowski |
| 10,393,882 B2 | 8/2019 | Dai et al. |
| 10,394,238 B2 | 8/2019 | Foster et al. |
| 10,398,084 B2 | 9/2019 | Ray et al. |
| 10,407,879 B2 | 9/2019 | Gonzalez et al. |
| 10,408,645 B2 | 9/2019 | Blank et al. |
| 10,417,842 B2 | 9/2019 | Runde |
| 2002/0116107 A1 | 8/2002 | Mahoney et al. |
| 2003/0028321 A1* | 2/2003 | Upadhyaya .......... A01C 21/005 701/50 |
| 2003/0112152 A1 | 6/2003 | Pickett |
| 2003/0120418 A1 | 6/2003 | Treichel |
| 2003/0130766 A1 | 7/2003 | Braunhardt et al. |
| 2004/0021563 A1 | 2/2004 | Mahoney et al. |
| 2004/0054457 A1 | 3/2004 | Kormann |
| 2005/0146428 A1 | 7/2005 | Mahoney et al. |
| 2006/0020402 A1 | 1/2006 | Bischoff et al. |
| 2006/0041354 A1 | 2/2006 | Schick et al. |
| 2006/0046895 A1 | 3/2006 | Thacher et al. |
| 2006/0070757 A1 | 4/2006 | Posselius et al. |
| 2006/0106535 A1 | 5/2006 | Duncan et al. |
| 2006/0190163 A1 | 8/2006 | Anderson |
| 2006/0217993 A1 | 9/2006 | Anderson |
| 2007/0003107 A1 | 1/2007 | Wei et al. |
| 2007/0039745 A1 | 2/2007 | Anderson et al. |
| 2007/0089390 A1 | 4/2007 | Hendrickson et al. |
| 2007/0175680 A1 | 8/2007 | Gouker |
| 2007/0250412 A1 | 10/2007 | Anderson |
| 2007/0282527 A1 | 12/2007 | Han et al. |
| 2008/0046130 A1 | 2/2008 | Faivre et al. |
| 2008/0053742 A1 | 3/2008 | Hublart et al. |
| 2008/0065286 A1 | 3/2008 | Han et al. |
| 2008/0122687 A1 | 5/2008 | Nelson et al. |
| 2009/0018712 A1 | 1/2009 | Duncan et al. |
| 2009/0099775 A1 | 4/2009 | Mott et al. |
| 2009/0112472 A1 | 4/2009 | Montgomery |
| 2009/0157259 A1 | 6/2009 | Han et al. |
| 2009/0199530 A1 | 8/2009 | Salley et al. |
| 2009/0240430 A1 | 9/2009 | Sachs et al. |
| 2009/0272551 A1 | 11/2009 | Thompson et al. |
| 2010/0023228 A1 | 1/2010 | Montgomery |
| 2010/0152943 A1 | 6/2010 | Matthews |
| 2010/0161183 A1 | 6/2010 | Beese |
| 2011/0046780 A1 | 2/2011 | Anderson |
| 2011/0046784 A1 | 2/2011 | Anderson |
| 2011/0046836 A1 | 2/2011 | Anderson |
| 2011/0077827 A1 | 3/2011 | Arshad et al. |
| 2011/0084851 A1 | 4/2011 | Peterson et al. |
| 2011/0089752 A1 | 4/2011 | Frediani et al. |
| 2011/0100656 A1 | 5/2011 | Connors et al. |
| 2011/0153143 A1 | 6/2011 | O'Neil et al. |
| 2011/0153338 A1 | 6/2011 | Anderson |
| 2011/0160961 A1 | 6/2011 | Wollenhaupt et al. |
| 2011/0160994 A1 | 6/2011 | Schmidt et al. |
| 2011/0166705 A1 | 7/2011 | Anderson et al. |
| 2011/0178635 A1 | 7/2011 | Anderson et al. |
| 2011/0209631 A1 | 9/2011 | Viaud |
| 2011/0213531 A1 | 9/2011 | Farley et al. |
| 2011/0270724 A1 | 11/2011 | O'Neil et al. |
| 2011/0295423 A1 | 12/2011 | Anderson |
| 2011/0311342 A1 | 12/2011 | Montgomery |
| 2012/0072317 A1 | 3/2012 | O'Neil |
| 2012/0072533 A1 | 3/2012 | O'Neil |
| 2012/0095638 A1 | 4/2012 | Anderson |
| 2012/0101679 A1 | 4/2012 | Anderson et al. |
| 2012/0101725 A1 | 4/2012 | Kondekar |
| 2012/0143429 A1 | 6/2012 | Anderson |
| 2012/0143642 A1 | 6/2012 | O'Neil |
| 2012/0158247 A1 | 6/2012 | Norris et al. |
| 2012/0215394 A1 | 8/2012 | Wang et al. |
| 2012/0253581 A1 | 10/2012 | Anderson |
| 2013/0019580 A1 | 1/2013 | Anderson et al. |
| 2013/0046418 A1 | 2/2013 | Anderson |
| 2013/0046446 A1 | 2/2013 | Anderson |
| 2013/0054075 A1 | 2/2013 | Montgomery |
| 2013/0054078 A1 | 2/2013 | Anderson |
| 2013/0166132 A1 | 6/2013 | Matthews |
| 2013/0166157 A1 | 6/2013 | Schleicher et al. |
| 2013/0173116 A1 | 7/2013 | Gustafson et al. |
| 2013/0197773 A1 | 8/2013 | Shuler et al. |
| 2013/0220652 A1 | 8/2013 | Thompson et al. |
| 2013/0282200 A1 | 10/2013 | Anderson |
| 2013/0289817 A1 | 10/2013 | Kellum |
| 2014/0121882 A1 | 5/2014 | Gilmore et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0230391 A1* | 8/2014 | Hendrickson ....... G01N 33/0098 702/2 |
| 2014/0259897 A1 | 9/2014 | Godbole et al. |
| 2014/0262559 A1 | 9/2014 | DeChristopher et al. |
| 2014/0277905 A1 | 9/2014 | Anderson |
| 2014/0277965 A1* | 9/2014 | Miller .................. A01C 21/005 701/50 |
| 2015/0045992 A1 | 2/2015 | Ashby et al. |
| 2015/0070209 A1 | 3/2015 | Keegan et al. |
| 2015/0094953 A1 | 4/2015 | Montgomery |
| 2015/0145720 A1 | 5/2015 | Matthews |
| 2015/0230393 A1* | 8/2015 | Madsen ................ A01C 21/00 701/50 |
| 2015/0241879 A1 | 8/2015 | Peterson |
| 2015/0301532 A1 | 10/2015 | Norris et al. |
| 2015/0319913 A1 | 11/2015 | Foster et al. |
| 2015/0348419 A1 | 12/2015 | Matthews |
| 2016/0029547 A1 | 2/2016 | Casper et al. |
| 2016/0033651 A1 | 2/2016 | Johnson et al. |
| 2016/0057923 A1* | 3/2016 | Sauder ................. A01C 21/005 324/207.25 |
| 2016/0095274 A1* | 4/2016 | Wendte ................ A01B 79/005 111/200 |
| 2016/0196700 A1 | 7/2016 | O'Neil et al. |
| 2016/0202357 A1 | 7/2016 | Matthews |
| 2016/0231427 A1 | 8/2016 | Matthews |
| 2016/0238711 A1 | 8/2016 | Matthews |
| 2016/0302357 A1 | 10/2016 | Tippery et al. |
| 2016/0360697 A1 | 12/2016 | Diaz |
| 2016/0368011 A1 | 12/2016 | Feldhaus et al. |
| 2016/0377736 A1 | 12/2016 | Zeitzew et al. |
| 2017/0010619 A1 | 1/2017 | Foster et al. |
| 2017/0013778 A1 | 1/2017 | Borry et al. |
| 2017/0055455 A1 | 3/2017 | Missotten et al. |
| 2017/0071122 A1 | 3/2017 | Schmidt |
| 2017/0086373 A1 | 3/2017 | Mahieu et al. |
| 2017/0086377 A1 | 3/2017 | Jongmans et al. |
| 2017/0112043 A1 | 4/2017 | Nair et al. |
| 2017/0197621 A1 | 7/2017 | Foster et al. |

(56) References Cited

U.S. PATENT DOCUMENTS

| | | |
|---|---|---|
| 2017/0212247 A1 | 7/2017 | Chen et al. |
| 2017/0221280 A1 | 8/2017 | Chaston et al. |
| 2017/0228145 A1 | 8/2017 | Schneider et al. |
| 2017/0231146 A1 | 8/2017 | Romig et al. |
| 2017/0261978 A1 | 9/2017 | Gresch |
| 2017/0269202 A1 | 9/2017 | Baum et al. |
| 2017/0269216 A1 | 9/2017 | Dai et al. |
| 2017/0269224 A1 | 9/2017 | Zhang et al. |
| 2017/0269225 A1 | 9/2017 | Dai et al. |
| 2017/0269231 A1 | 9/2017 | Dai et al. |
| 2017/0269564 A1 | 9/2017 | Anderson et al. |
| 2017/0299728 A1 | 10/2017 | Lie et al. |
| 2017/0299730 A1 | 10/2017 | Lie et al. |
| 2017/0299731 A1 | 10/2017 | Lie et al. |
| 2017/0320492 A1 | 11/2017 | Ferrari et al. |
| 2017/0322301 A1 | 11/2017 | Ferrari et al. |
| 2017/0323263 A1 | 11/2017 | Foster et al. |
| 2017/0325399 A1 | 11/2017 | Heinrich et al. |
| 2017/0339820 A1 | 11/2017 | Foster et al. |
| 2017/0339822 A1 | 11/2017 | Gresch et al. |
| 2017/0355264 A1 | 12/2017 | Foster et al. |
| 2017/0355398 A1 | 12/2017 | Dix et al. |
| 2017/0356406 A1 | 12/2017 | Jacobsthal et al. |
| 2017/0357267 A1 | 12/2017 | Foster et al. |
| 2017/0357400 A1 | 12/2017 | Foster et al. |
| 2018/0022402 A1 | 1/2018 | Hamilton et al. |
| 2018/0024252 A1 | 1/2018 | Vogler et al. |
| 2018/0025561 A1 | 1/2018 | Bueermann |
| 2018/0050724 A1 | 2/2018 | Morselli et al. |
| 2018/0054954 A1 | 3/2018 | Nale et al. |
| 2018/0077851 A1 | 3/2018 | Hatton |
| 2018/0079271 A1 | 3/2018 | Zwanzger et al. |
| 2018/0084710 A1 | 3/2018 | Lawson |
| 2018/0092301 A1 | 4/2018 | Vandike et al. |
| 2018/0105037 A1 | 4/2018 | Müller et al. |
| 2018/0108980 A1 | 4/2018 | Foster et al. |
| 2018/0170274 A1 | 6/2018 | Gomez et al. |
| 2018/0171590 A1 | 6/2018 | Kean |
| 2018/0184578 A1* | 7/2018 | Stuber ................ A01M 9/0092 |
| 2018/0188366 A1 | 7/2018 | Kemmer et al. |
| 2018/0192575 A1 | 7/2018 | Sudbrink et al. |
| 2018/0196438 A1 | 7/2018 | Newlin et al. |
| 2018/0196441 A1 | 7/2018 | Muench et al. |
| 2018/0201268 A1 | 7/2018 | Palmroth et al. |
| 2018/0201310 A1 | 7/2018 | Rotole |
| 2018/0210450 A1 | 7/2018 | Ferrari et al. |
| 2018/0223502 A1 | 8/2018 | Kenkel et al. |
| 2018/0232674 A1 | 8/2018 | Bilde |
| 2018/0238823 A1 | 8/2018 | Puhalla et al. |
| 2018/0242517 A1 | 8/2018 | Davis et al. |
| 2018/0243771 A1 | 8/2018 | Davis et al. |
| 2018/0243772 A1 | 8/2018 | Davis et al. |
| 2018/0243773 A1 | 8/2018 | Davis et al. |
| 2018/0243774 A1 | 8/2018 | Davis et al. |
| 2018/0266829 A1 | 9/2018 | Fritz et al. |
| 2018/0279539 A1 | 10/2018 | Wägner |
| 2018/0279599 A1 | 10/2018 | Struve |
| 2018/0281852 A1 | 10/2018 | Eagles |
| 2018/0310474 A1 | 11/2018 | Posselius et al. |
| 2018/0313958 A1 | 11/2018 | Yu et al. |
| 2018/0319392 A1 | 11/2018 | Posselius et al. |
| 2018/0319396 A1 | 11/2018 | Foster et al. |
| 2018/0321683 A1 | 11/2018 | Foster et al. |
| 2018/0325012 A1 | 11/2018 | Ferrari et al. |
| 2018/0325013 A1 | 11/2018 | Boydens et al. |
| 2018/0325014 A1 | 11/2018 | Debbaut |
| 2018/0325028 A1 | 11/2018 | Rotole et al. |
| 2018/0325029 A1 | 11/2018 | Rotole et al. |
| 2018/0325031 A1 | 11/2018 | Rotole et al. |
| 2018/0325032 A1 | 11/2018 | Rotole et al. |
| 2018/0326989 A1 | 11/2018 | Foster et al. |
| 2018/0334186 A1 | 11/2018 | Bebernes et al. |
| 2018/0338413 A1 | 11/2018 | Connell et al. |
| 2018/0338422 A1 | 11/2018 | Brubaker |
| 2018/0346020 A1 | 12/2018 | Bebernes et al. |
| 2018/0359905 A1 | 12/2018 | Foster et al. |
| 2018/0359906 A1 | 12/2018 | Foster et al. |
| 2018/0359908 A1 | 12/2018 | Kelley et al. |
| 2018/0359917 A1 | 12/2018 | Blank et al. |
| 2018/0359919 A1 | 12/2018 | Blank et al. |
| 2018/0364698 A1 | 12/2018 | Blank et al. |
| 2018/0364726 A1 | 12/2018 | Foster et al. |
| 2018/0364739 A1 | 12/2018 | Foster et al. |
| 2018/0373256 A1 | 12/2018 | Runde et al. |
| 2018/0373257 A1 | 12/2018 | Runde et al. |
| 2019/0000007 A1 | 1/2019 | Schleicher et al. |
| 2019/0008088 A1 | 1/2019 | Posselius et al. |
| 2019/0014723 A1 | 1/2019 | Stanhope et al. |
| 2019/0018414 A1 | 1/2019 | Guzmann |
| 2019/0021226 A1 | 1/2019 | Dima et al. |
| 2019/0047010 A1 | 2/2019 | Barker et al. |
| 2019/0059199 A1 | 2/2019 | Stanhope |
| 2019/0064795 A1 | 2/2019 | Berggren et al. |
| 2019/0071115 A1 | 3/2019 | Brooks et al. |
| 2019/0077456 A1 | 3/2019 | Bunderson et al. |
| 2019/0082582 A1 | 3/2019 | Ackerman et al. |
| 2019/0097310 A1 | 3/2019 | Foster et al. |
| 2019/0098824 A1 | 4/2019 | Kovach |
| 2019/0098846 A1 | 4/2019 | Murphy |
| 2019/0101921 A1 | 4/2019 | Anderson |
| 2019/0102623 A1 | 4/2019 | Flood et al. |
| 2019/0104722 A1* | 4/2019 | Slaughter ............ A01M 7/0089 |
| 2019/0111744 A1 | 4/2019 | Billich |
| 2019/0113936 A1 | 4/2019 | Anderson et al. |
| 2019/0114847 A1 | 4/2019 | Wagner et al. |
| 2019/0116726 A1 | 4/2019 | Paralikar et al. |
| 2019/0120973 A1 | 4/2019 | Martin et al. |
| 2019/0124825 A1 | 5/2019 | Anderson |
| 2019/0124826 A1 | 5/2019 | Pickett et al. |
| 2019/0124844 A1 | 5/2019 | Lovett et al. |
| 2019/0126308 A1 | 5/2019 | Hendrickson et al. |
| 2019/0128293 A1 | 5/2019 | Maro |
| 2019/0128864 A1 | 5/2019 | Pickett et al. |
| 2019/0129690 A1 | 5/2019 | Anderson |
| 2019/0133022 A1 | 5/2019 | Connell et al. |
| 2019/0135066 A1 | 5/2019 | Schwalbe et al. |
| 2019/0141878 A1 | 5/2019 | Foster et al. |
| 2019/0141883 A1 | 5/2019 | Zemenchik |
| 2019/0146426 A1 | 5/2019 | Blank |
| 2019/0150352 A1 | 5/2019 | Salzman |
| 2019/0162551 A1 | 5/2019 | Kean |
| 2019/0174560 A1 | 6/2019 | Matthews |
| 2019/0174667 A1 | 6/2019 | Gresch et al. |
| 2019/0188613 A1 | 6/2019 | Margherio et al. |
| 2019/0193559 A1 | 6/2019 | Trowbridge |
| 2019/0198015 A1 | 6/2019 | Cherney et al. |
| 2019/0204095 A1 | 7/2019 | Anderson |
| 2019/0220023 A1 | 7/2019 | Noess |
| 2019/0220024 A1 | 7/2019 | Noess |
| 2019/0220031 A1 | 7/2019 | Noess |
| 2019/0230843 A1 | 8/2019 | Ricketts et al. |
| 2019/0230845 A1 | 8/2019 | Buchner et al. |
| 2019/0230855 A1 | 8/2019 | Reed et al. |
| 2019/0232735 A1 | 8/2019 | Salzman |
| 2019/0235529 A1 | 8/2019 | Barrick et al. |
| 2019/0248421 A1 | 8/2019 | Jacobsthal et al. |
| 2019/0257678 A1 | 8/2019 | Posselius et al. |
| 2019/0258271 A1 | 8/2019 | Sporrer et al. |
| 2019/0261560 A1 | 8/2019 | Jelenkovic |
| 2019/0277687 A1 | 9/2019 | Blank et al. |
| 2020/0221635 A1* | 7/2020 | Hendrickson ........ A01D 45/021 |
| 2020/0337235 A1* | 10/2020 | Blank ................ A01M 21/043 |
| 2021/0127559 A1* | 5/2021 | Hubner ................ A01C 7/128 |
| 2021/0173410 A1* | 6/2021 | Berridge ............ A01D 41/127 |
| 2022/0361473 A1* | 11/2022 | Janssen .............. G01N 33/0098 |

\* cited by examiner

METHODS FOR IMPROVED AGRICULTURAL PROCEDURES

CROSS-REFERENCE TO RELATED APPLICATIONS

This application claims priority to U.S. Provisional Patent Application No. 63/060,286, filed on Aug. 3, 2020, the entirety of which is hereby incorporated herein by reference.

FIELD OF THE INVENTION

The disclosure relates generally to methods of improving procedural operations of an agricultural vehicle. In particular, in one embodiment, the disclosure provides for determining the precise location of each seed planted and using the seed planting location data to improve post-planting operations. In another embodiment, the disclosure provides for determining the location of wet zones in an agricultural field and using the wet zone location data to plan an optimal path through the field to avoid wet areas. In another embodiment, the disclosure provides for improved methods for tendering seed and chemical inputs for an agricultural operation. In another embodiment, the disclosure provides for improved dynamic path planning of an autonomous agricultural vehicle. In another embodiment, the disclosure provides for improved methods of planting end rows in an agricultural field. In another embodiment, the disclosure provides for improved methods for planting multiple seed varieties in an agricultural field.

BACKGROUND

Many procedural issues are encountered during agricultural operations whether those operations are performed using a manned vehicle or by an autonomous vehicle.

Once an agricultural field has been planted, removal of weeds is required to prevent unwanted vegetation from outcompeting the desired crop. One way of dealing with unwanted vegetation is to apply herbicides to the field after crops have emerged. Typically a self-propelled sprayer, a sprayer implement, or aerial applicator traverses the field applying herbicide over the entire soil surface, resulting in excessive input costs and excessive chemicals that may runoff to waterways. Therefore, a method for targeted destruction of unwanted vegetation is desired.

Ideally, every seed planted in the soil emerges to become a healthy and productive plant. However, in reality only a portion of the seeds planted in a field emerge. Some seed companies guarantee a particular emergence rate. In a lab setting where a small observable number of seeds are examined for emergence statistics, it is easy to count how many of the planted seeds actually germinate. In a typical farmer's field, it is not feasible to manually count how many seeds germinate, and farmers have no way of measuring what their emergence rate is. Therefore, a method for automatically determining emergence rates in an agricultural field is desired.

Seeds are typically planted in evenly spaced rows, and individual seeds in each row are planted at evenly spaced distances from each other. Ideally, seeds are planted with consistent spacing between each planted seed. However, some error is introduced under actual planting conditions, resulting in some inconsistency in plant spacing. At times when GPS information unavailable or inaccurate, a method for determining location in the field based on plant spacing is desired.

Wet zones in an agricultural field are problematic for an agricultural vehicle. Extremely muddy conditions can cause a vehicle to veer off course or become stuck. Mud is also problematic for an agricultural implement as mud can clog seed tubes and other operating parts of the implement. When an agricultural vehicle is manned, the driver can see when the vehicle is approaching a wet zone and steer the vehicle appropriately; however, a solution for detecting wet zones without human intervention is needed for autonomous vehicles. One approach that has been used is to send a scout to identify wet zones in the field, but using a scout is time consuming and still requires human intervention. Therefore, a method for automatic detection of wet zones in an agricultural field is desired.

Tendering refers to replenishing seed, fuel, fertilizer, herbicide, pesticide, or other agricultural inputs that become depleted during an agricultural operation such as tilling, planting, or harvesting. Traditionally, a human operator receives visible or audible alerts that an input has become low, and then manually loads or refills seed, chemicals, or fuel as needed. When the operation is performed by autonomous equipment, a human operator may not be present to perform or supervise tendering. Further, if an incorrect input is tendered, then the wrong seed type may be planted in a location, or the wrong chemical may be applied creating a costly, dangerous, or environmentally damaging situation. Therefore, a method of accurately tendering agricultural inputs that does not require a human operator is desired.

In a typical agricultural operation, an operator works from one end of a field to the other end. The operator can sense any people, animals, wet zones, or other obstacles and make judgment calls about how to operate differently to avoid injury or damage. The operator can also make judgement calls related to when it makes sense to work rows that are more time consuming or when operations should take place near homes or businesses. When agricultural operations are performed by autonomous equipment, no human operator or remote observer is present to make these judgment calls, and operations typically proceed according to a mission plan. If a person or other obstacle enters the path of the vehicle, then serious injury or damage may occur. Thus, methods of dynamically altering the path of an autonomous agricultural vehicle to account for changing conditions such as conserving agricultural inputs until a tendering station is available, increasing safety, avoiding disrupting homes or businesses, or avoiding wet zones in the field are desired.

In a typical agricultural planting operation, the majority of the field is the "interior portion," which consists of seeds planted in rows that stretch nearly from one end of the field to the other end. Some space is required at the ends of the rows for the vehicle and planter to turn around. The turn-around area of the field is planted as "end rows," which are passes that traverse around the outermost perimeter of the field. The end rows planted in the turn-around area are often generally perpendicular to the rows planted in the interior. Most farmers plant the end rows first, and then plant the interior; however when end rows are planted first, the tractor and planter create berms in the end rows and otherwise disturb the seed bed while planting the interior rows. Quite often the outer end row is the only hazard in a field. Throughout the year, fence posts fall, trees fall, and fencing wire sags and drifts. Moreover, farmers' boundary files for a field are often in error as they typically use a coarse web-based application or inaccurate information from a GPS receiver to create them. Thus, a method for planting end rows that creates accurate boundary information and avoids berming and disturbance of the seed bed in the end rows is desired.

To maximize yield despite the variety of soil types and conditions, different hybrids or varieties of seed may be planted throughout a single agricultural field based on varying conditions within that field. For example, a drought resistant variety may be planted in drier areas of a field only and another variety planted in the remaining areas of the field. Many manufacturers of agricultural equipment produce multi-hybrid seed meters with multiple seed delivering mechanisms that are capable of automatically switching from planting one variety of seed to another during a planting operation; however, such multi-hybrid seed meters are expensive. Thus, a cost-effective method for planting multiple varieties of seed in an agricultural field is desired.

BRIEF SUMMARY

In accordance with various embodiments of the invention, methods for improved agricultural procedures are provided. In one embodiment, a method for determining the precise location of each seed planted in an agricultural field is provided.

In another embodiment, a method for targeted destruction of unwanted vegetation is provided.

In another embodiment, a method for determining emergence statistics for seed planted in an agricultural field is provided.

In another embodiment, a method for determining location in a field based on spacing of plants is provided.

In another embodiment, a method for detecting wet zones in an agricultural field using wheel slippage is provided.

In another embodiment, a method for detecting wet zones in an agricultural field using soil contrast is provided.

In another embodiment, a method for detecting wet zones in an agricultural field using soil resistance is provided.

In another embodiment, a method for tendering agricultural inputs is provided. Agricultural inputs may be supplied to the vehicle and/or implement using a hybrid seed pack having multiple compartments in which each compartment contains a different agricultural input.

In another embodiment, a method for dynamically changing the path of an agricultural vehicle to conserve inputs is provided.

In another embodiment, a method for dynamically changing the path of an agricultural vehicle to improve safety is provided.

In another embodiment, a method for dynamically changing the path of an agricultural vehicle to reduce disrupting noise is provided.

In another embodiment, a method for dynamically changing the path of an agricultural vehicle to avoid wet zones is provided.

In another embodiment, a method for planting end rows in an agricultural field is provided.

In another embodiment, a method for planting multiple varieties of seed in an agricultural field is provided.

BRIEF DESCRIPTION OF THE DRAWINGS

Figure 1:
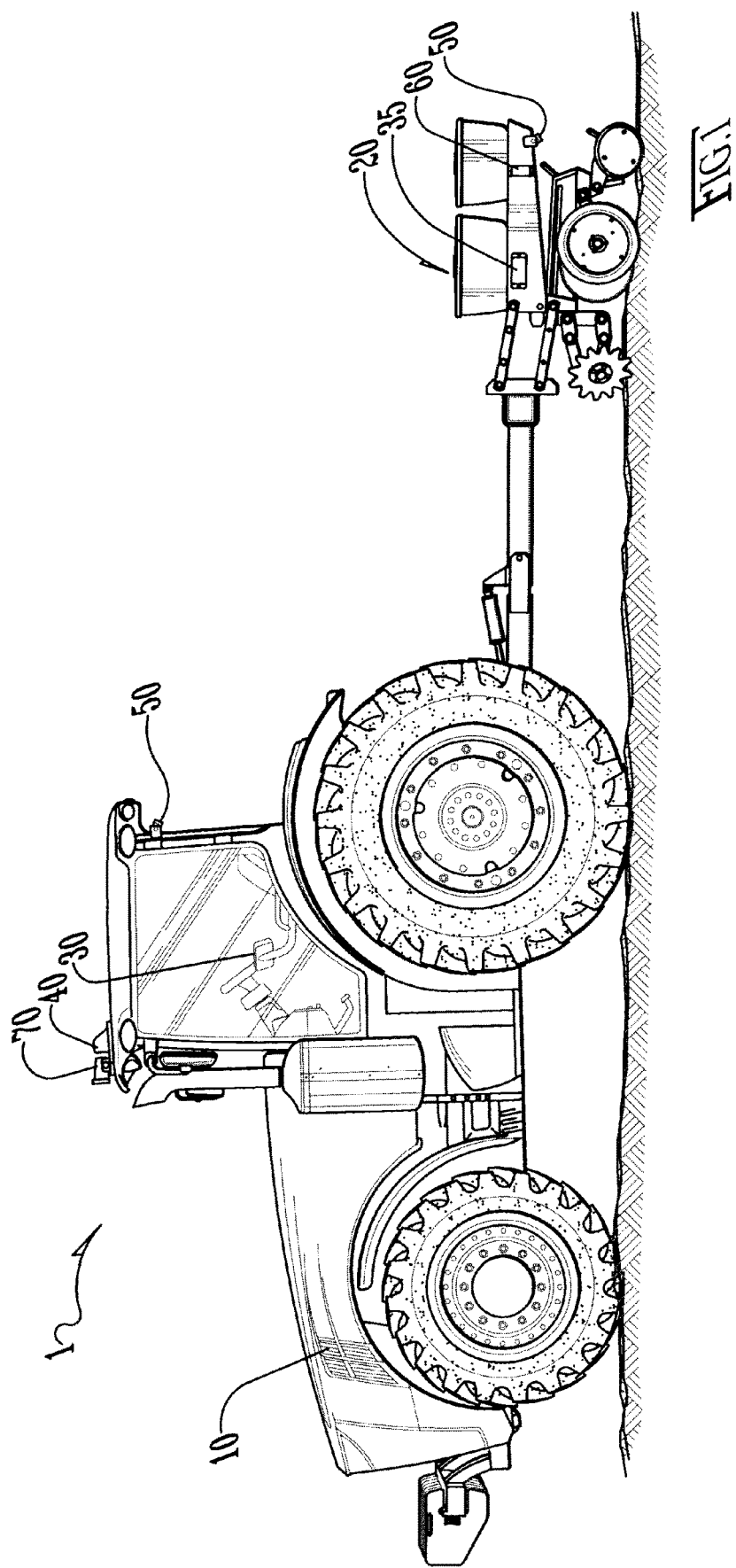

Having thus described the invention in general terms, reference will now be made to the accompanying drawings, which are not necessarily drawn to scale, and wherein:

FIG. 1 illustrates a typical tractor and planter arrangement.

Figure 2:
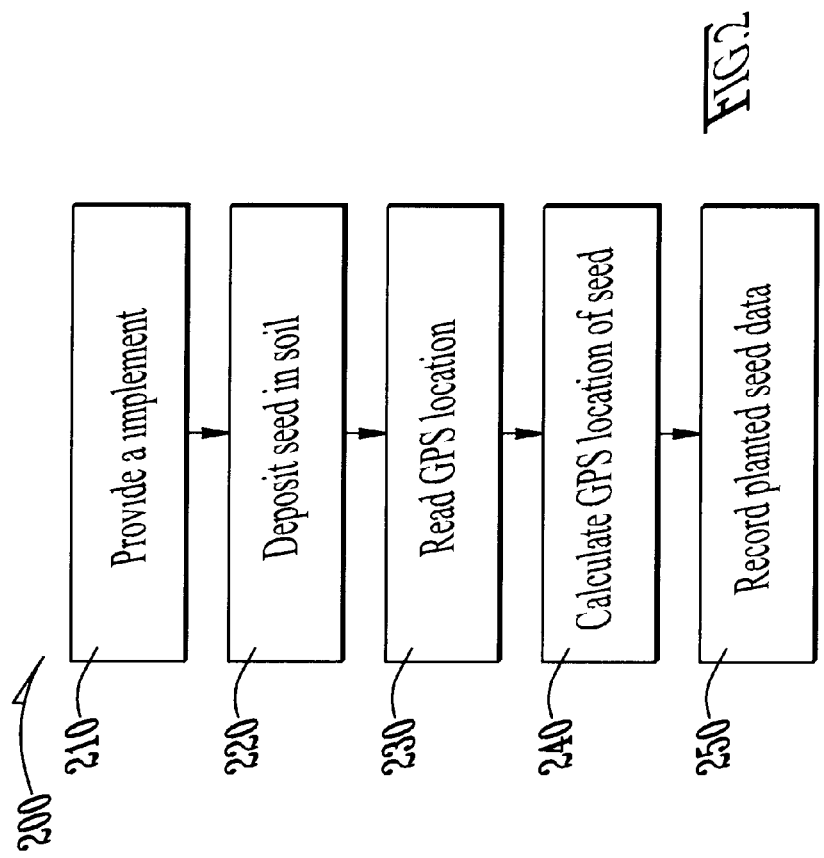

FIG. 2 illustrates a method for determining the precise location of each seed planted in an agricultural field in accordance with an embodiment of the invention.

Figure 3:
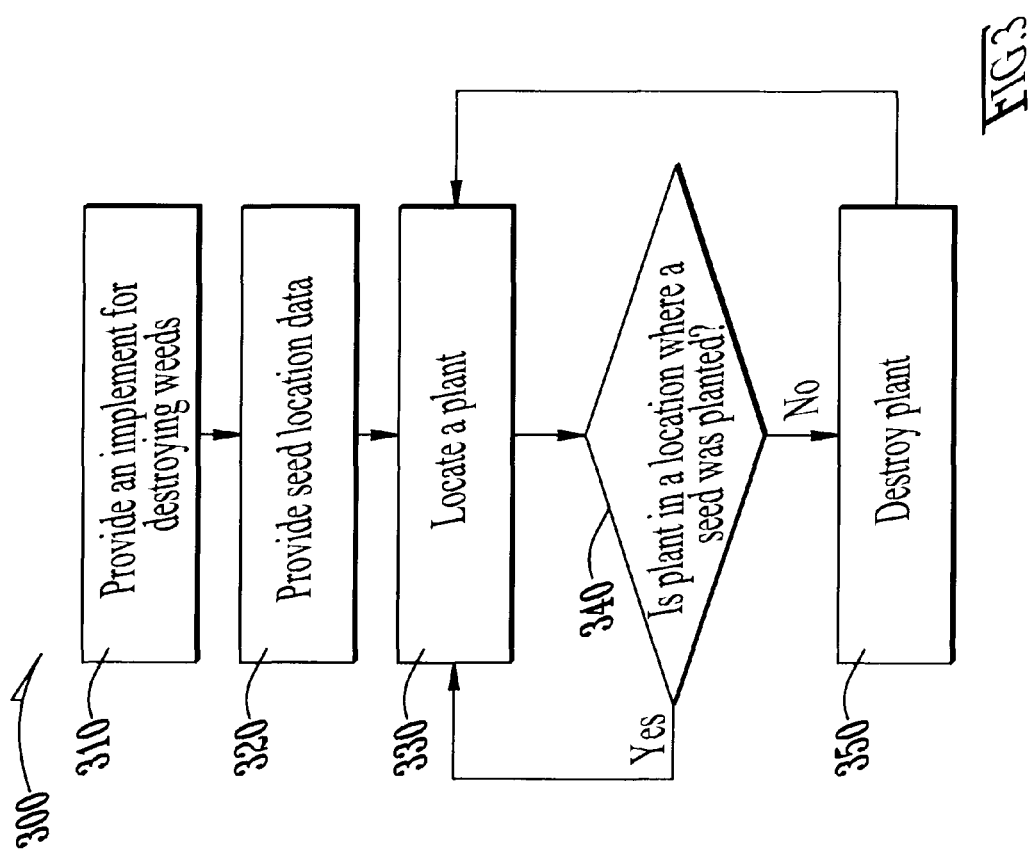

FIG. 3 illustrates a method for targeted destruction of unwanted vegetation in accordance with an embodiment of the invention.

Figure 4:
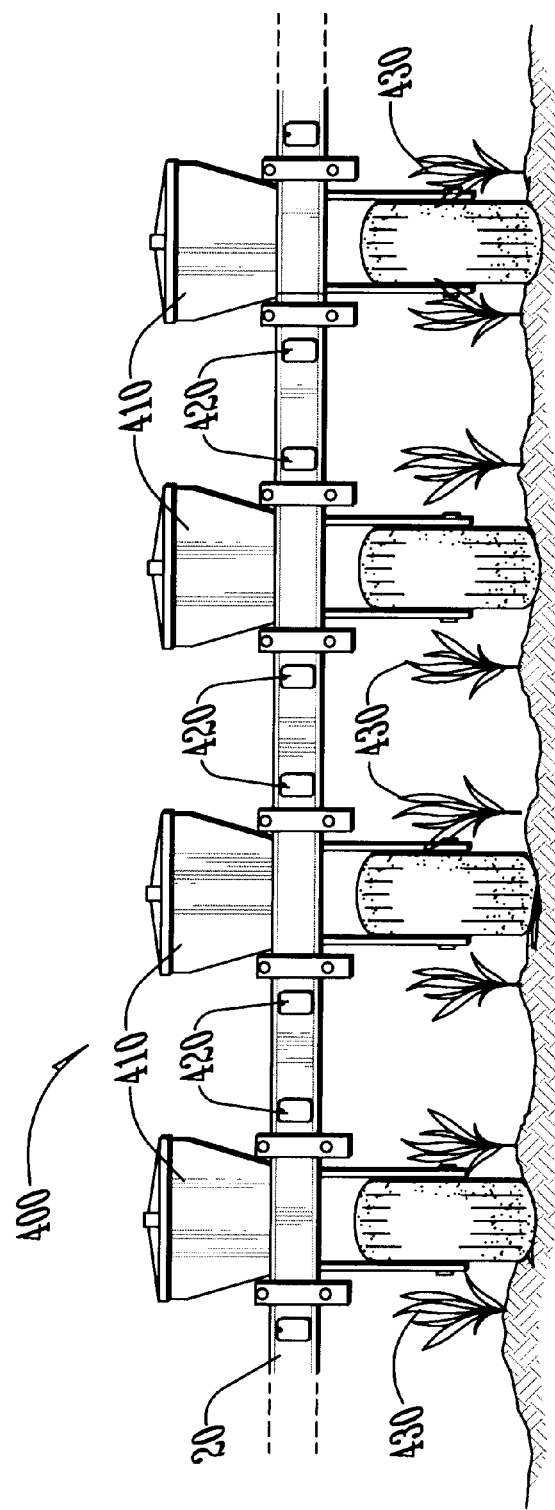

FIG. 4 illustrates an apparatus for detecting a plant in an agricultural field in accordance with an embodiment of the invention.

Figure 5:
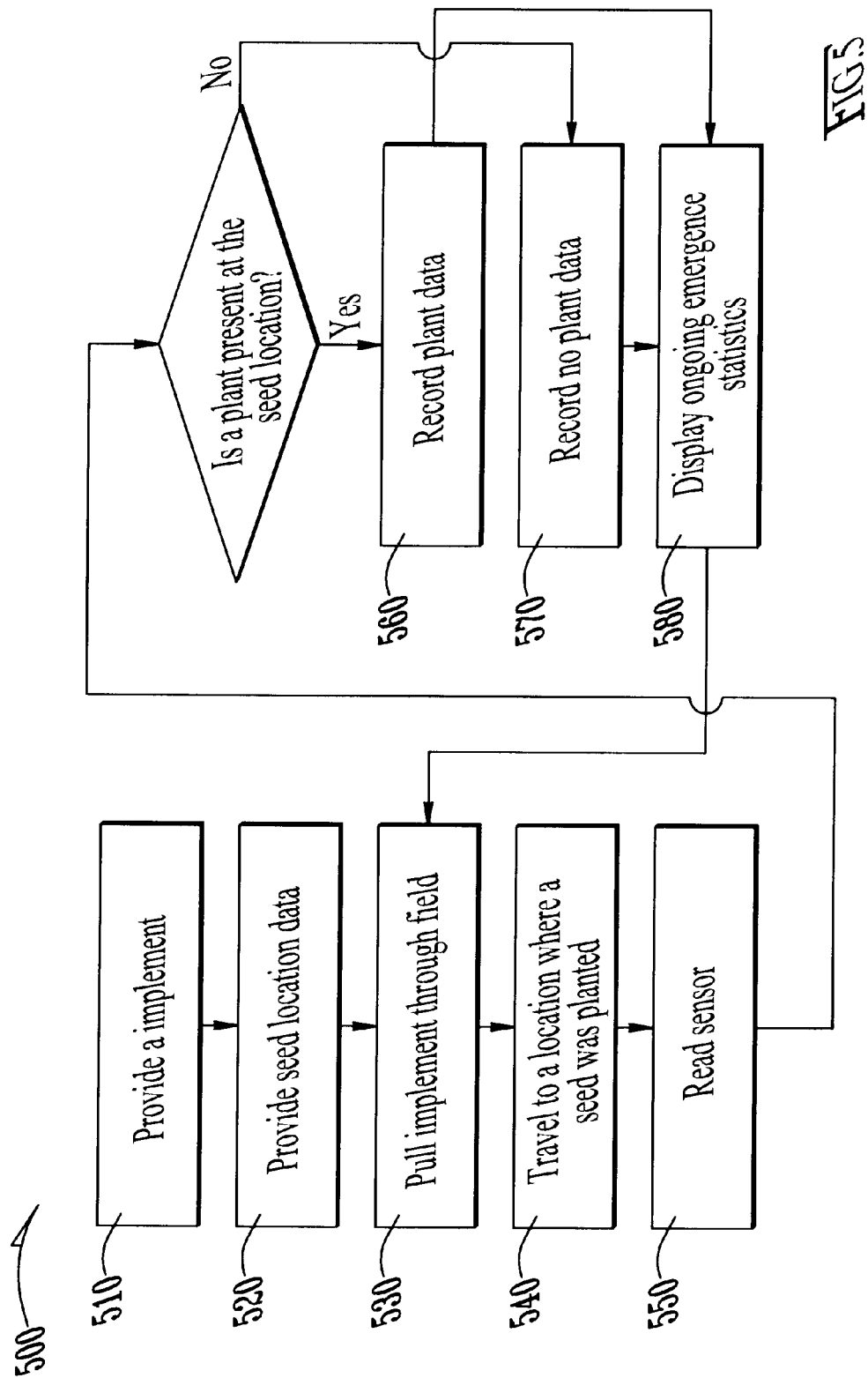

FIG. 5 illustrates a method for determining emergence statistics in accordance with an embodiment of the invention.

Figure 6:
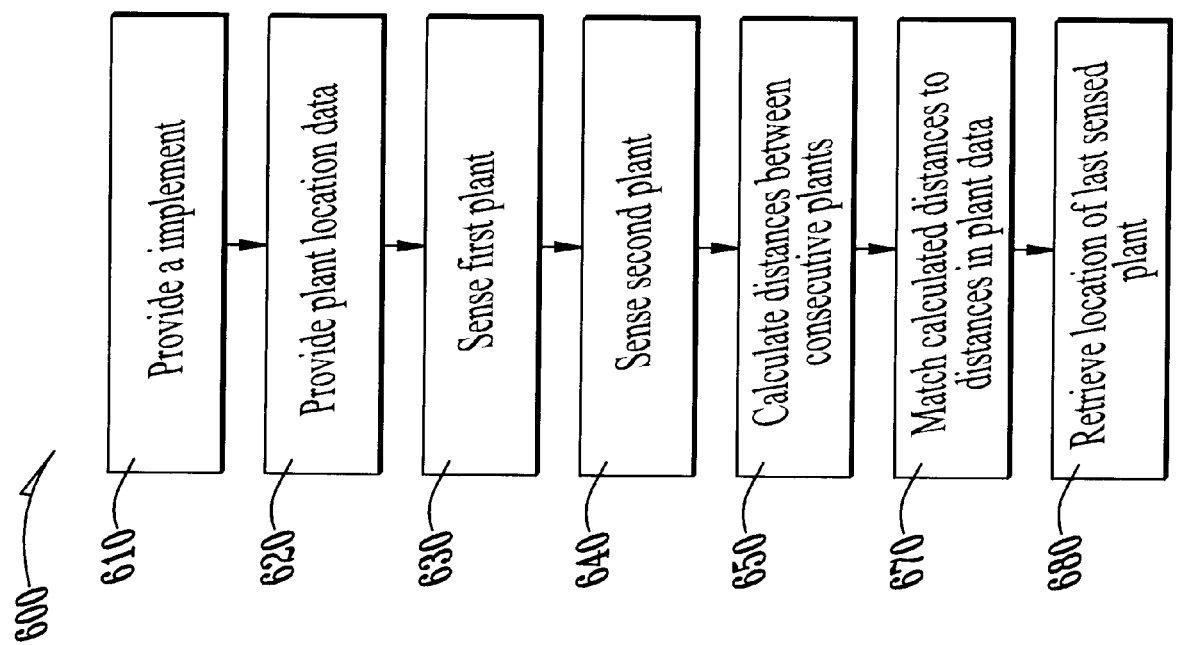

FIG. 6 illustrates a method for determining location using plant spacing data in accordance with an embodiment of the invention.

Figure 7:
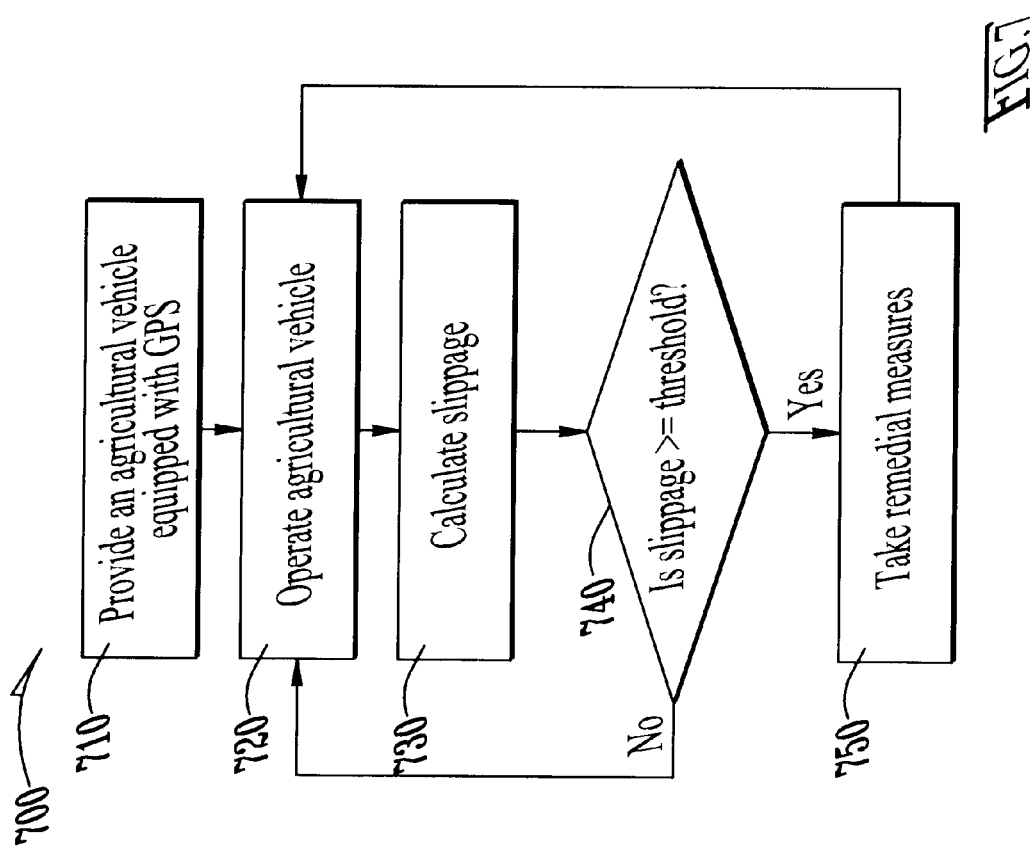

FIG. 7 illustrates a method for detecting wet zones in an agricultural field using wheel slippage in accordance with an embodiment of the invention.

Figure 8:
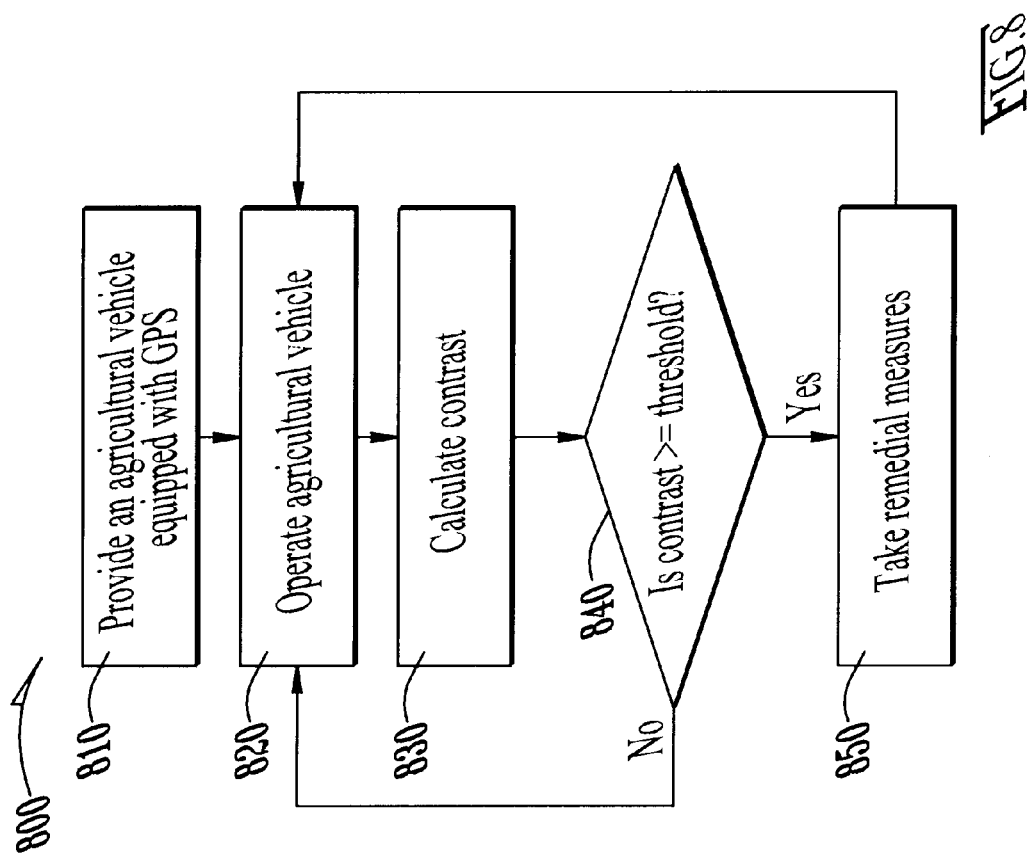

FIG. 8 illustrates a method for detecting wet zones in an agricultural field using soil contrast an accordance with an embodiment of the invention.

Figure 9:
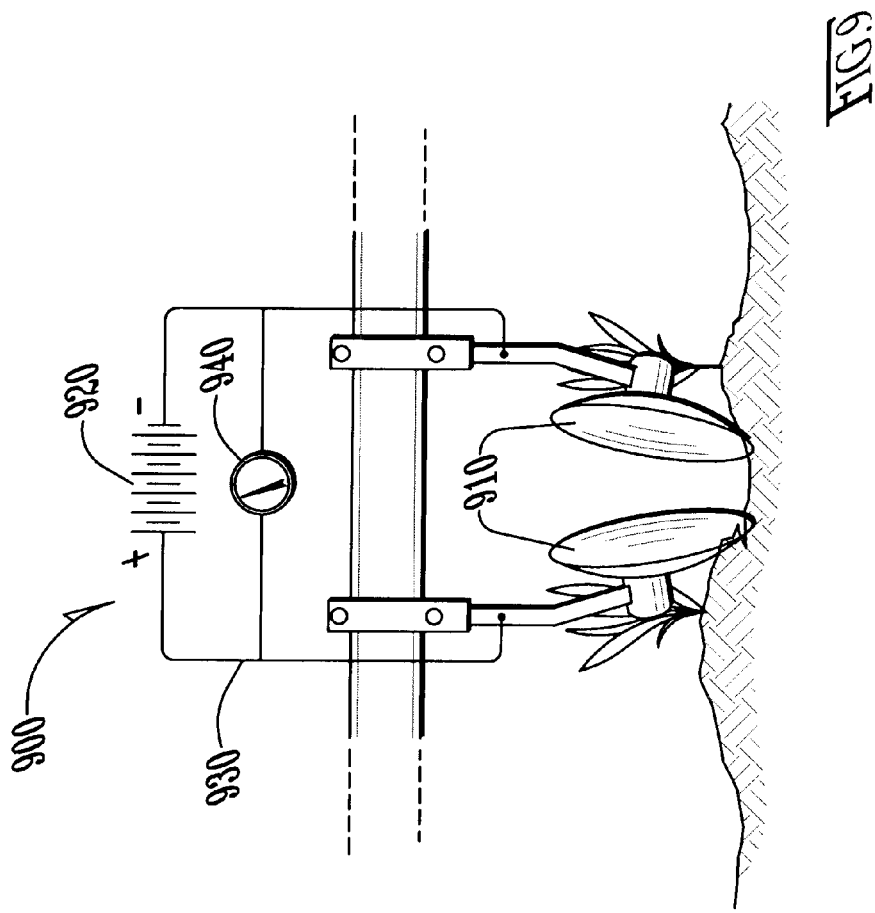

FIG. 9 illustrates an apparatus for measuring soil resistance in accordance with an embodiment of the invention.

Figure 10:
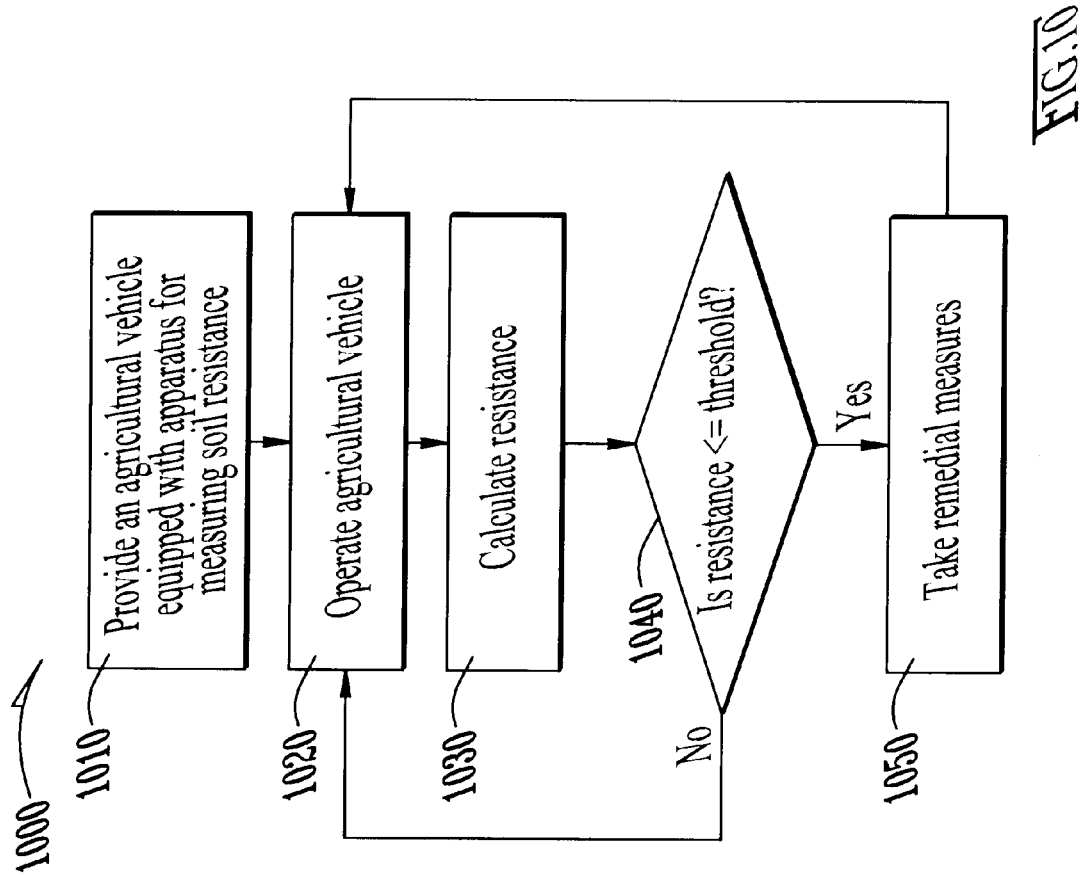

FIG. 10 illustrates a method for detecting wet zones in an agricultural field using soil resistance in accordance with an embodiment of the invention.

Figure 11:
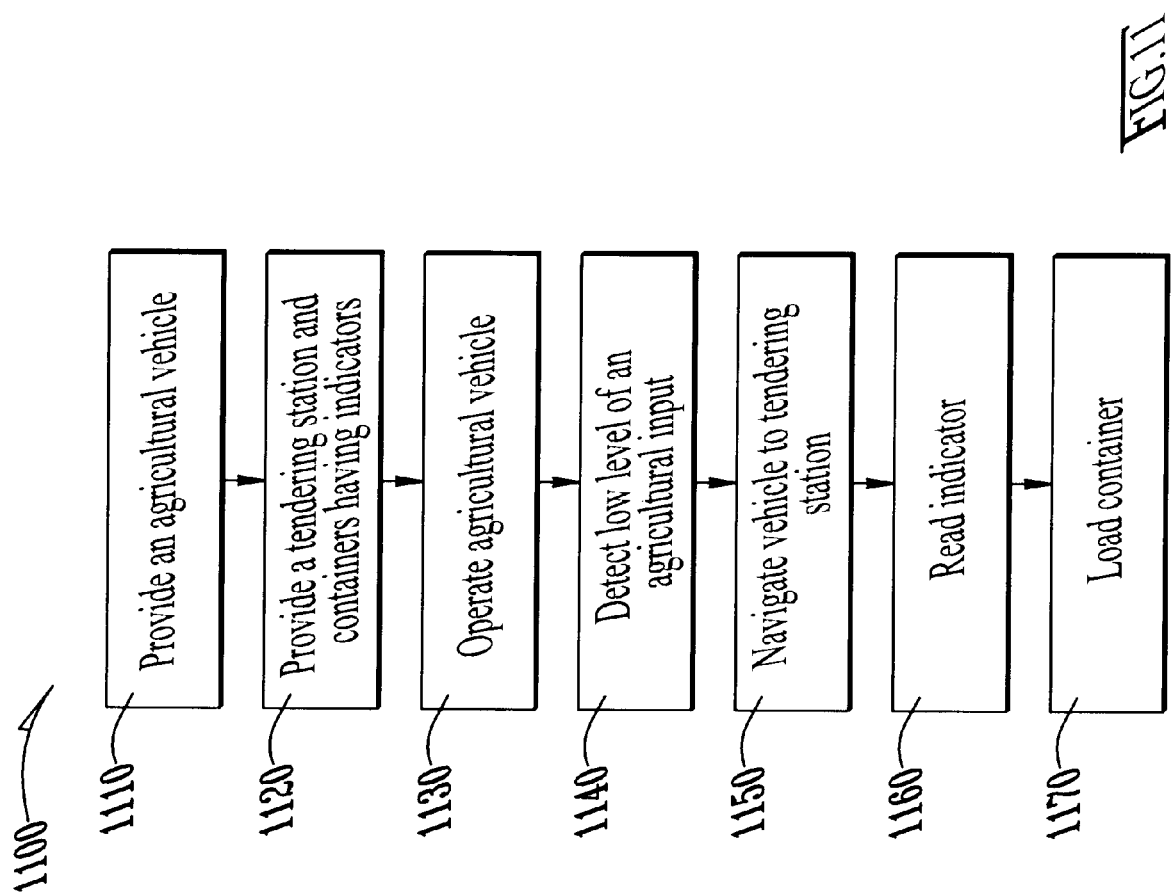

FIG. 11 illustrates a method for tendering agricultural inputs in accordance with an embodiment of the invention.

Figure 12:
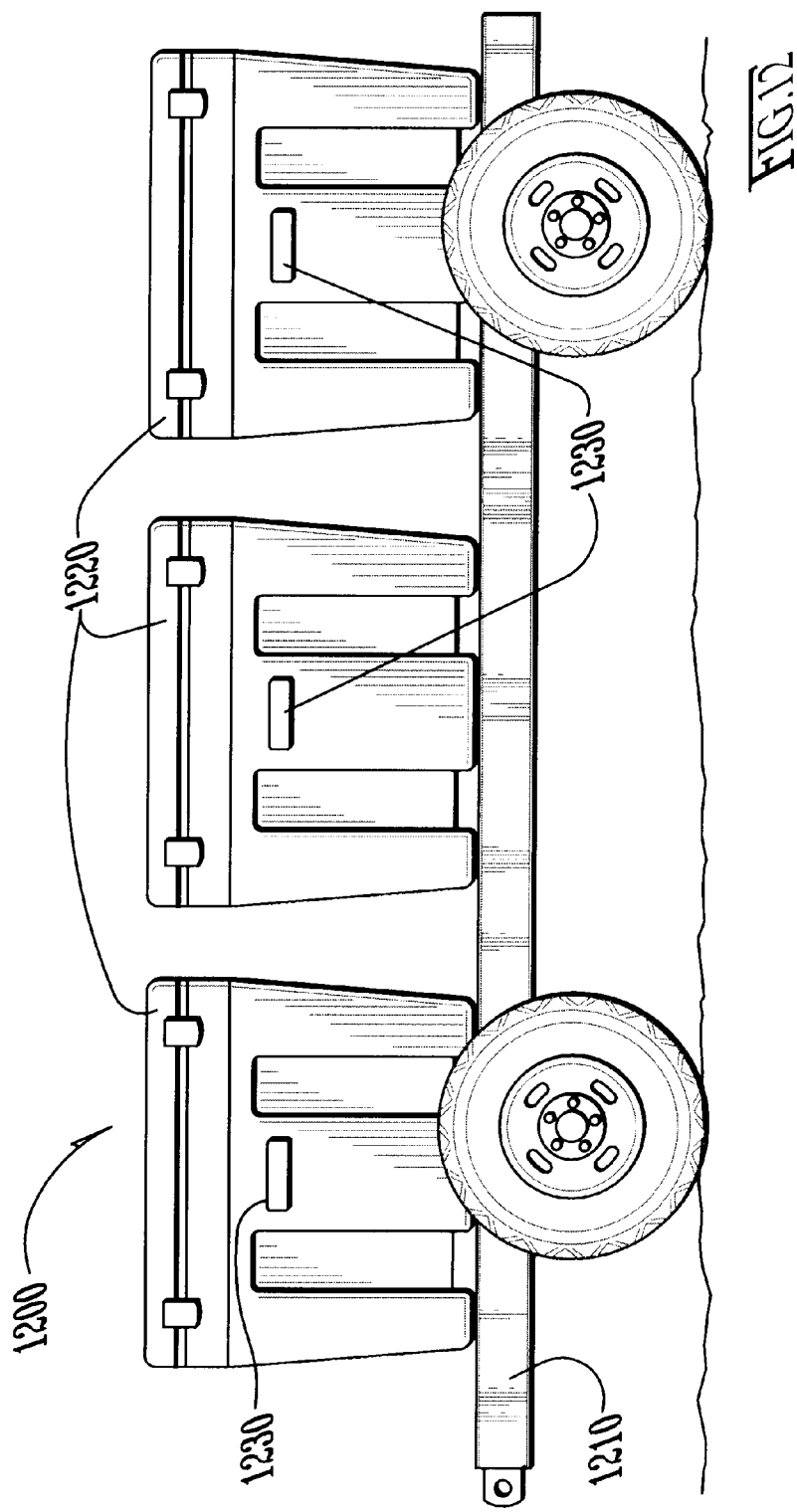

FIG. 12 illustrates a tendering station in accordance with an embodiment of the invention.

Figure 13:
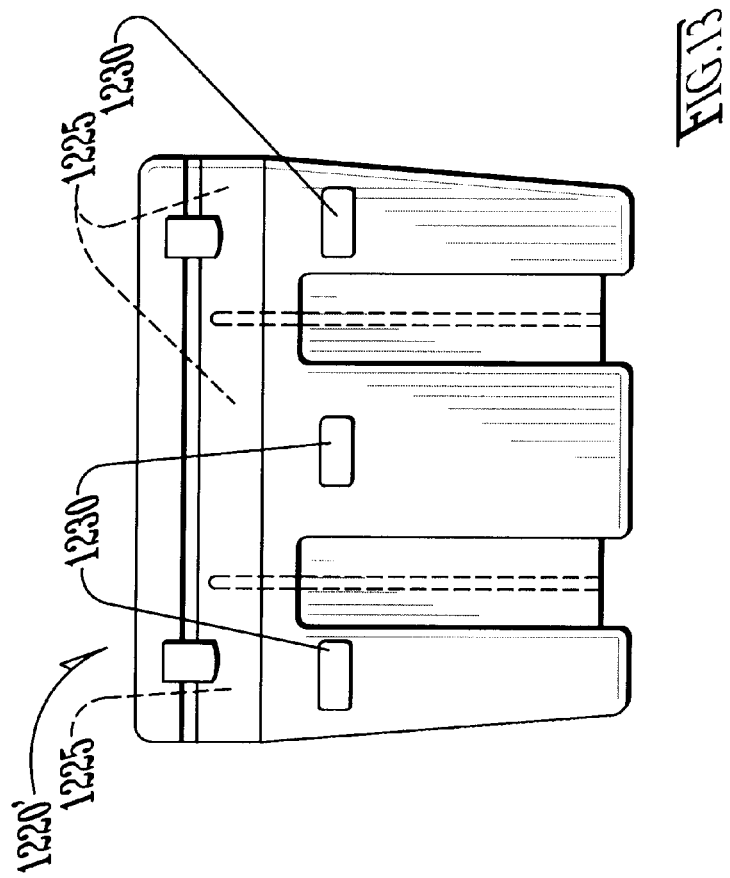

FIG. 13 illustrates a cross section of a hybrid seed pack in accordance with an embodiment of the invention.

Figure 14:
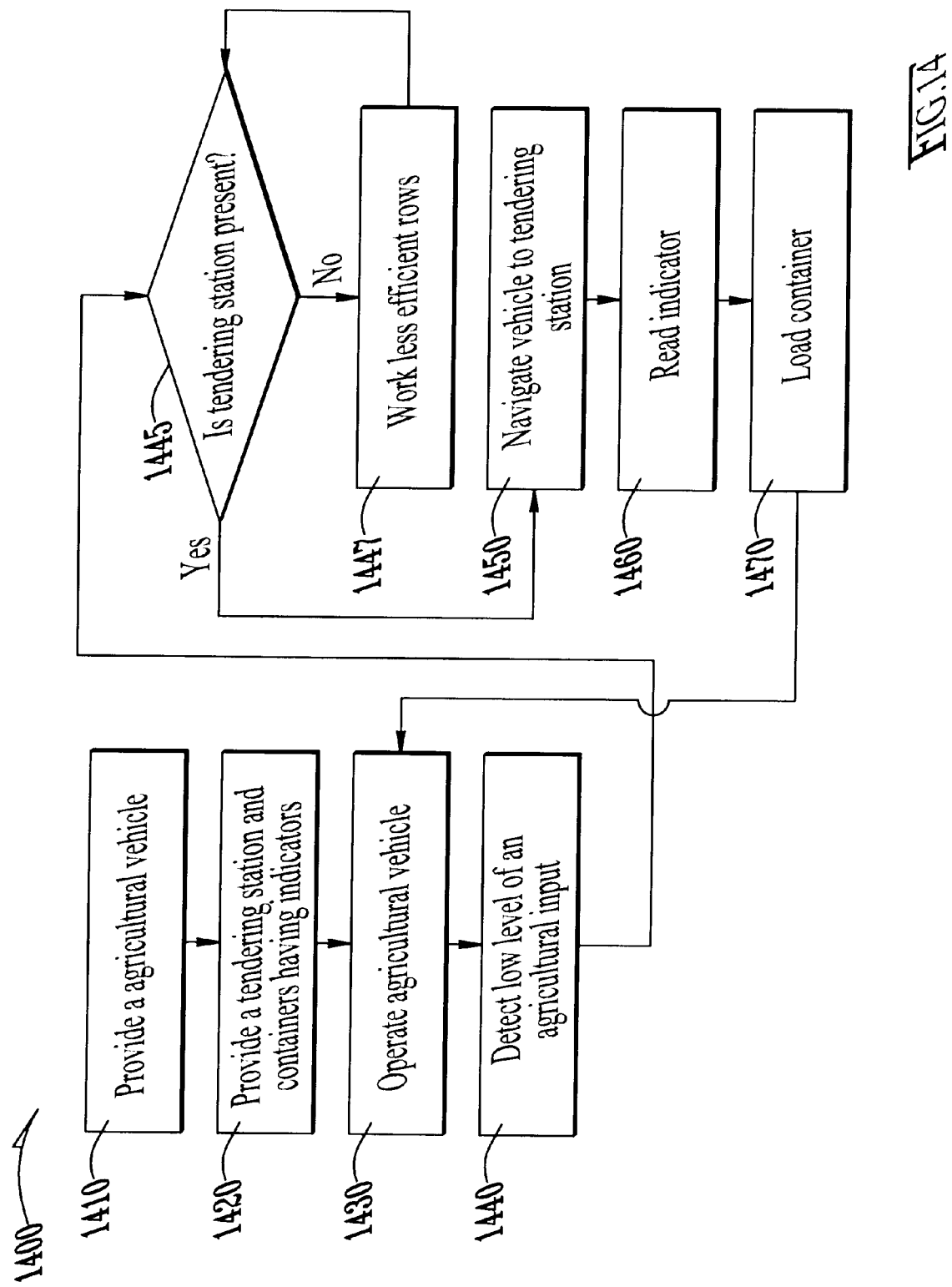

FIG. 14 illustrates a method for dynamically changing the path of an agricultural vehicle to conserve inputs in accordance with an embodiment of the invention.

Figure 15:
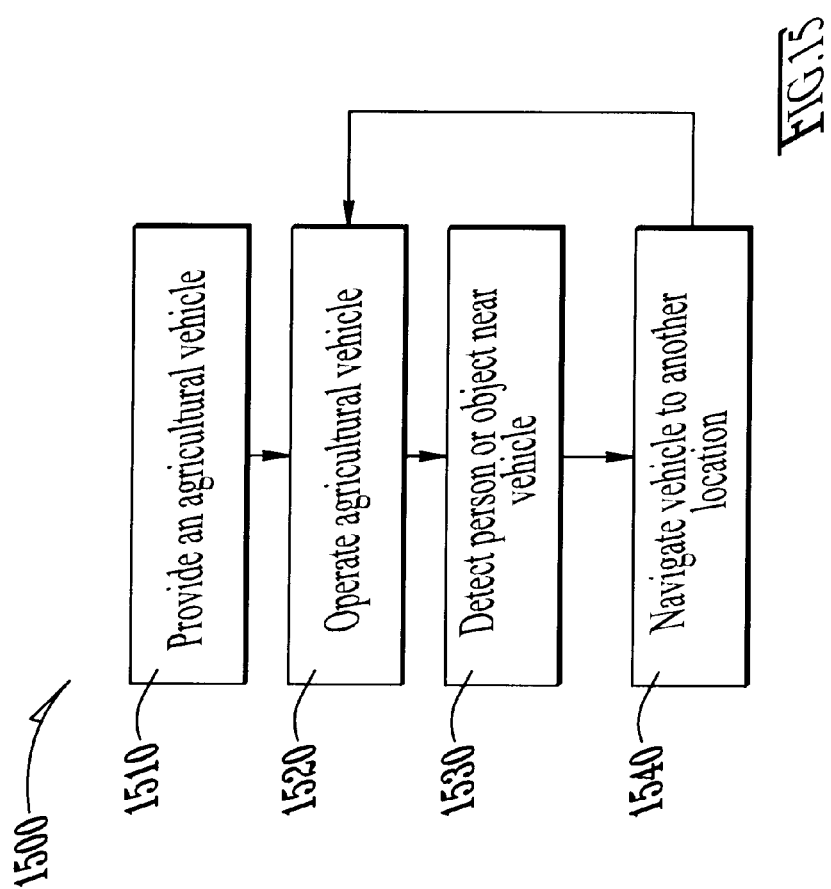

FIG. 15 illustrates a method for dynamically changing the path of an agricultural vehicle to improve safety in accordance with an embodiment of the invention.

Figure 16:
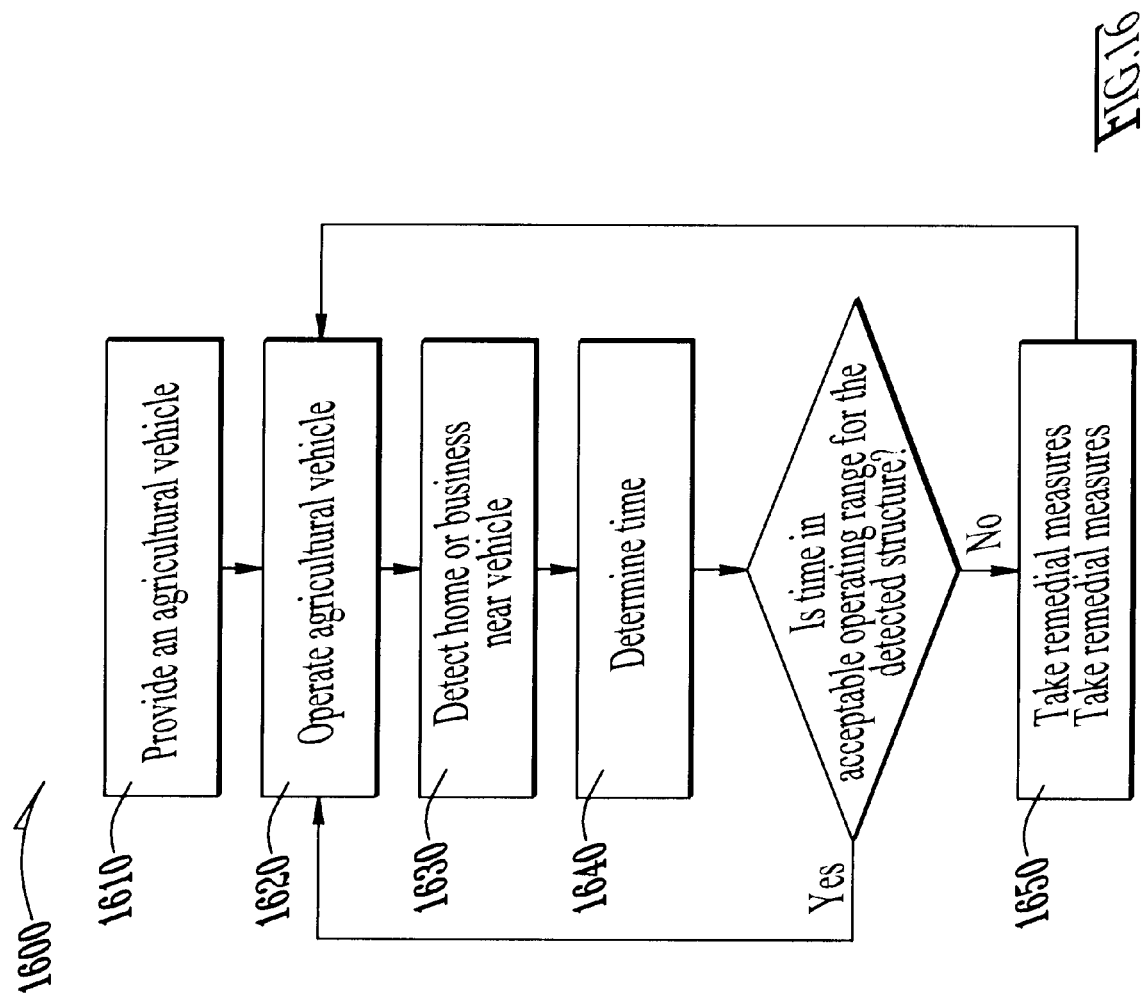

FIG. 16 illustrates a method for dynamically changing the path of an agricultural vehicle to reduce disrupting noise in accordance with an embodiment of the invention.

Figure 17:
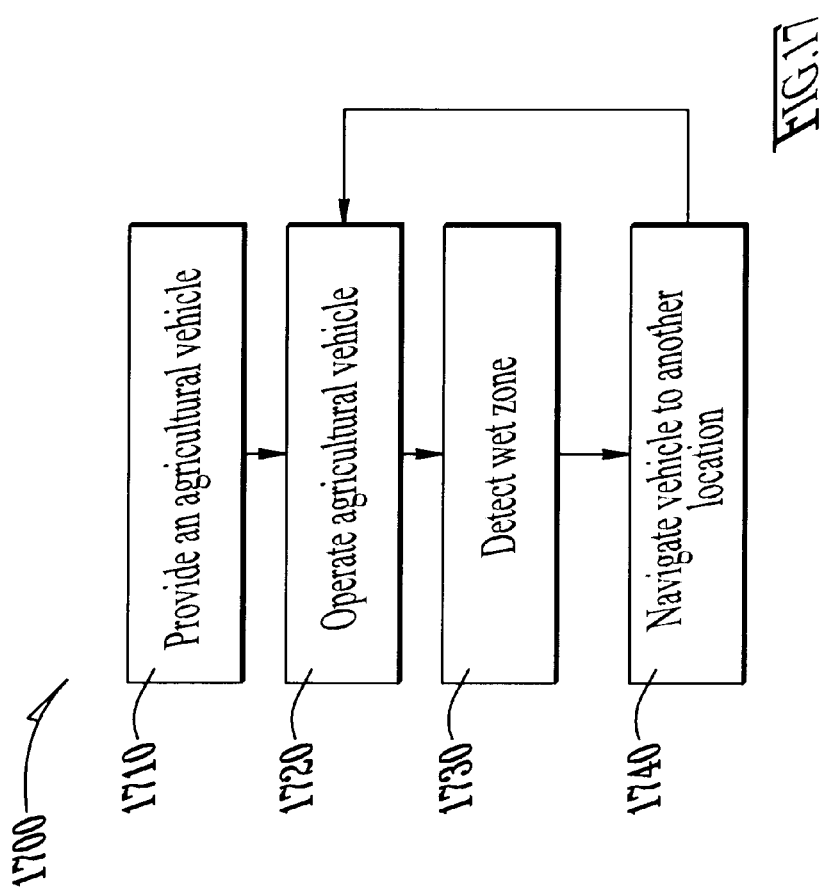

FIG. 17 illustrates a method for dynamically changing the path of an agricultural vehicle to avoid wet zones in accordance with an embodiment of the invention.

Figure 18:
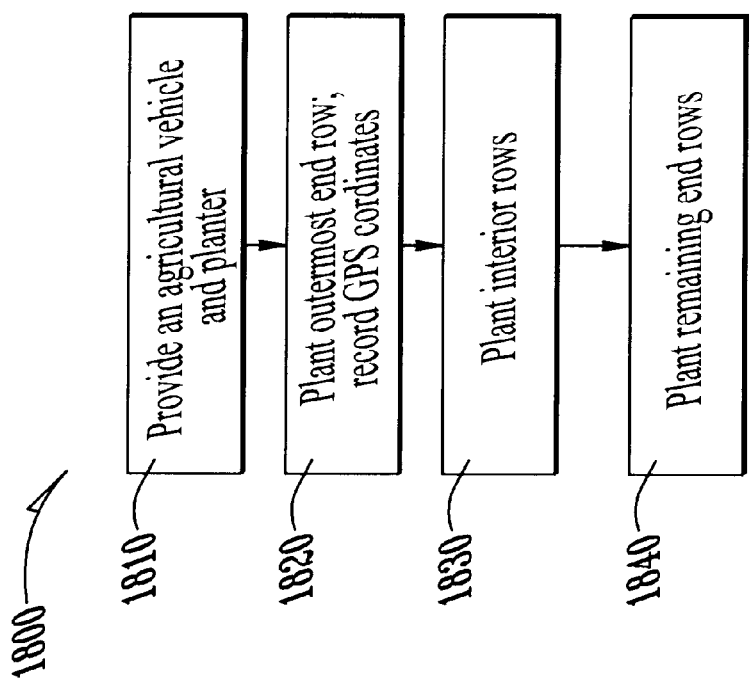

FIG. 18 illustrates a method for planting end rows in an agricultural field in accordance with an embodiment of the invention.

Figure 19:
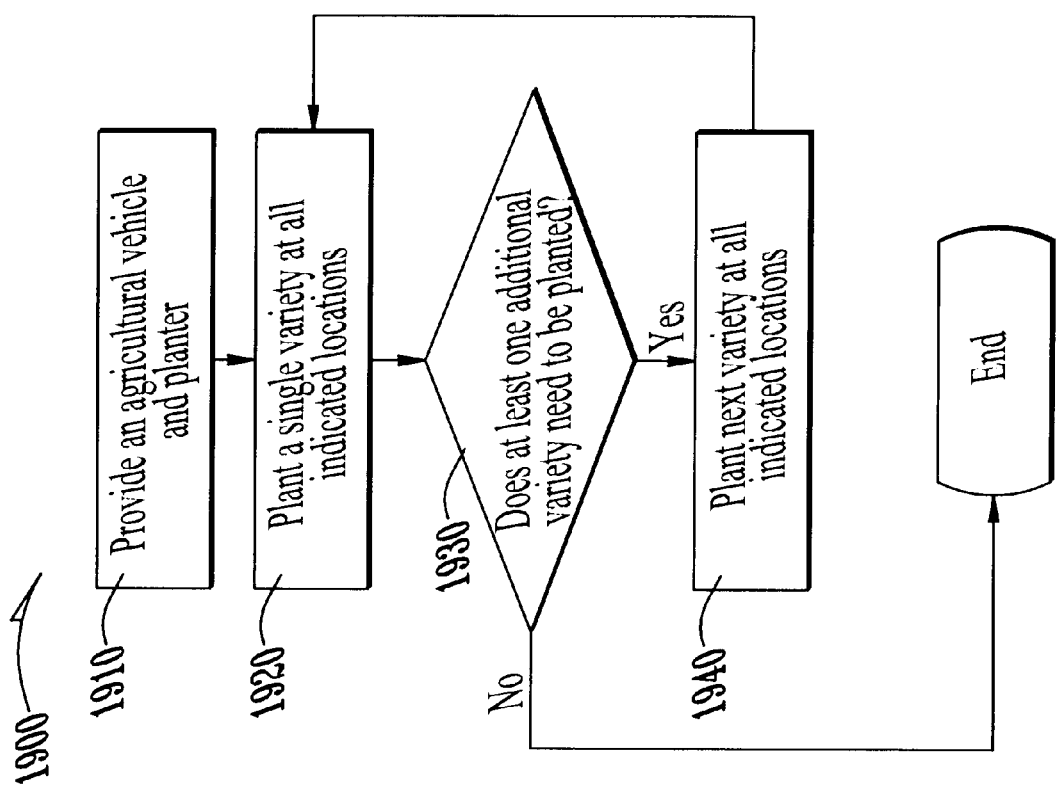

FIG. 19 illustrates a method for planting multiple varieties of seed in an agricultural field in accordance with an embodiment of the invention.

Figure 20:
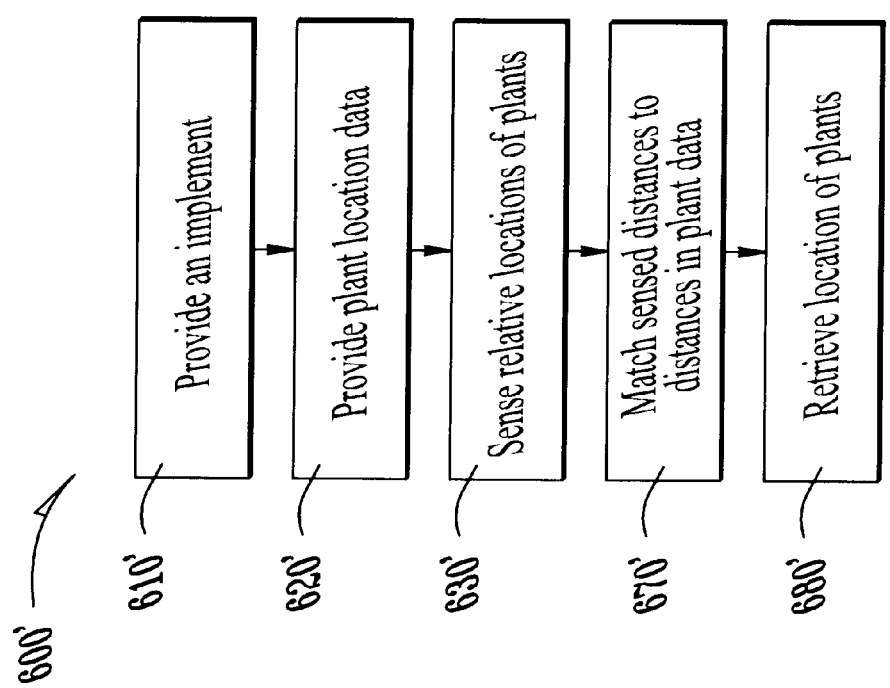

FIG. 20 illustrates an alternative method for determining location using plant spacing data in accordance with an embodiment of the invention.

DETAILED DESCRIPTION

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus are not shown in one or more of the figures for clarity and to facilitate explanation of embodiments of the present invention.

In accordance with one embodiment, FIG. 1 illustrates a typical arrangement 1 of an agricultural vehicle 10 and an implement 20 used for performing agricultural operations such as tilling or planting seeds in an agricultural field. Agricultural vehicle 10 may be a manned or autonomous tractor capable of towing and powering implements. Alternatively, agricultural vehicle 10 may be a manned or autonomous harvester. An implement 20 may be coupled to agricultural vehicle 10 using either a drawbar or three-point hitch. Agricultural vehicle 10 may be referred to as simply "vehicle 10" throughout this disclosure. Implement 20 may be any commercially available tillage equipment, planter, or other implement. Agricultural vehicle 10 is equipped with one or more GPS units 40 and one or more computers 30 and/or microprocessors 35. An implement 20 pulled by vehicle 10 may also be equipped with one or more GPS units 40. GPS unit 40 may be referred to as GPS unit 40 or GPS receiver 40 without departing from the scope of the disclosure. In addition, any references to readings of location data from GPS unit 40 may refer to data from a GPS unit on vehicle 10, on implement 20, or any combination of readings from a vehicle 10 or implement 20 mounted GPS unit 40.

A computer 30 mounted on or otherwise connected to agricultural vehicle 10 communicates with various systems of agricultural vehicle 10 and implement 20. For example, computer 30 is configured to receive and transmit signals to the CAN bus, engine control unit (ECU), and other systems of agricultural vehicle 10. Computer 30 also communicates with one or more GPS units 40 mounted to agricultural vehicle 10 or implement 20. Computer 30 may be a tablet, smart phone, laptop, desktop computer, commercially available display for use in agricultural vehicles, or similar computing device. GPS unit 40 is configured to receive satellite signals indicating the precise location of the GPS unit 40 and agricultural vehicle 10 or implement 20. Software running on computer 30 is configured to control many aspects of the arrangement 1. For example, using location information from the GPS unit 40, software running on computer 30 can control the movement of agricultural vehicle 10, raising and lowering of the implement 20, and controlling seed rates applied by the implement 20 when implement 20 is a planter. Software running on computer 30 is also configured to record data regarding the operation of the agricultural vehicle 10 and implement 20, including the path driven by agricultural vehicle 10, seed rates applied by the implement 20 when implement 20 is a planter throughout each planted field, and data generated by various sensors mounted to the agricultural vehicle 10 or implement 20.

A microprocessor 35 mounted on implement 20 is electronically connected to any sensors mounted on the implement 20. Microprocessor 35 is configured to receive signals from any attached sensors and perform processing to determine if sensor readings are within acceptable ranges. Microprocessor 35 is also configured to receive and transmit signals to the computer 30. If microprocessor 35 detects an abnormal sensor reading, then that information is transmitted to computer 30, and the agricultural vehicle 10 or implement 20 can be stopped or other remediation measures can be taken. Throughout this disclosure, any processing of sensor signals may be performed on either computer 30 or microprocessor 35. In a typical implement, simple processing tasks are performed by microprocessor 35, and readings and results captured by microprocessor 35 are communicated to computer 30 for further processor or other action.

Determining the Precise Location of Each Seed or Plant

As shown in FIG. 2, a method 200 for determining the precise location of each seed planted in an agricultural field begins at step 210 with providing an implement 20 which is a planter configured to plant seeds in soil. Implement 20 is pulled by an agricultural vehicle 10 equipped with a GPS unit 40, and implement 20 may additionally be equipped with a GPS unit 40 and a computer 30 and/or microprocessor 35.

While an agricultural vehicle 10 pulls implement 20 through the field, a series of seeds are routed from a hopper or other storage location of implement 20 through a seed tube, deposited in the soil, and covered with soil. At step 220, a seed is deposited into the soil. Simultaneously with depositing the seed into the soil at step 220, the GPS location is determined by the GPS unit 40 at step 230. The GPS location is communicated to computer 30 or microprocessor 35.

The GPS location determined at step 230 represents the precise latitude and longitude of the GPS unit 40 when the location is read. The GPS reading captured from GPS unit 40 indicates the coordinates of the mounting location of the GPS unit 40 and does not necessarily represent the precise location of the seed that was planted at step 220. At step 240, the location of the planted seed is calculated by computer 30 or microprocessor 35 by adding offsets to the GPS location determined at step 230. The offsets are constant values representing the distance from the GPS unit 40 to the row unit of implement 20 that planted the seed at step 220. Each row unit of implement 20 has its own set of unique offsets that, when added to the GPS location determined at step 230, represent the precise location of a seed planted by that row unit. In one embodiment calculating the location of the planted seed 240 may involve adding the offsets to the GPS reading to determine the location of the seed to achieve an adjusted location representing the precise location of the planted seed. Alternatively, calculating the location of the planted seed 240 may involve determining the appropriate offset, and the location of the seed that will be stored at step 250 comprises the reading of the GPS unit 40 and the offset.

At step 250, software running on microprocessor 35 or computer 30 stores seed data. The seed data may comprise the offset-adjusted location of the seed calculated at step 240, the GPS unit 40 location and offset determined at step 240, the seed hybrid or variety, the identity of the row unit that deposited the seed in the soil, or any other available information about the seed or planting.

Steps 220-250 are repeated continuously for each row unit on the implement 20 as long as the implement 20 is engaged in a planting operation.

Targeted Destruction of Weeds

As shown in FIG. 3, a method 300 for targeted destruction of weeds begins at step 310 in which an agricultural vehicle 10 and/or implement 20 configured to destroy weeds is provided. An agricultural vehicle 10 configured to destroy weeds may be a self-propelled sprayer configured to spray herbicide through a number of nozzles spaced along the sprayer's booms, in which case an implement 20 is not required to complete the method 300. Implement 20 may be a sprayer configured to be pulled by an agricultural vehicle 10 such as a tractor and spray herbicide through a number of nozzles spaced along the sprayer's booms. Alternatively, implement 20 may be a tillage implement or other implement configured remove or otherwise destroy weeds mechanically, using electricity, using laser, using heat, or using other means. Implement 20 is equipped with a GPS unit 40 and a computer 30 and/or microprocessor 35.

At step 320, seed location data is provided to computer 30 and/or microprocessor 35. Seed data may be collected as described in the section "Determining the precise location of each seed or plant." Alternatively, seed data may be collected by another method. Seed data comprises the location of each seed that was planted in the agricultural field to be weeded, and may comprise other information such as the seed variety or maps indicating the locations of rows in the field. Seed data may have been stored to computer 30 and/or microprocessor 35 during the planting operation. Alternatively seed data may be transferred to computer 30 and/or microprocessor 35 using a cable connected to another device or using removable storage such as an SD card.

At step 330, a plant is located as the agricultural vehicle 10 and/or implement 20 traverse the field. The plant may be located using a camera or other vision sensor, laser, or tactile sensor.

At step 340, software running on computer 30 or microprocessor 35 determines if the plant located at step 330 is a desirable crop plant or a weed. The GPS location of the weed is determined by reading the GPS location using GPS unit 40 and adding offsets as needed to determine the precise location of the plant in question. Each sensor of implement 20 has its own set of unique offsets that, when added to the GPS location indicate the location of the sensor. By identifying the sensor that sensed the plant, the location of the plant can be determined. The location of the plant in question is compared to the plant data set provided at step 320. If the location of the plant in question is included in the set of plant data, then the plant in question emerged from a seed deliberately planted in the field during a planting operation, and the plant in question is not sprayed or otherwise removed or destroyed. If the location of the plant in question is not included in the set of plant data, then the plant in question is a weed, and the method 300 proceeds to step 350 in which the weed is destroyed. At step 350 agricultural vehicle 10 or implement 20 may apply an amount of an herbicide at the weed's location or take other action to remove or destroy the weed mechanically or by other means.

The method 300 is repeated continuously across agricultural vehicle 10 or implement 20 as long as the agricultural vehicle 10 or implement 20 is engaged in a weed destruction operation.

Determining Emergence Statistics

As shown in FIG. 4, an apparatus 400 for locating plants in an agricultural field comprises an implement 20 configured to sense the presence of one or more plants. Implement 20 is pulled by an agricultural vehicle 10, and implement 20 is equipped with a GPS unit 40 and a computer 30 and/or microprocessor 35. Implement 20 may be any commercially available implement, such as tillage equipment or a sprayer, having one or more units 410 in which each row unit 410 is equipped with one or more sensors 420 configured to determine if a plant is present at a particular location. Alternatively, implement 20 may be an implement having multiple row units 410 in which each row unit 410 is equipped with one or more sensors 420 configured to detect the presence of plants in an agricultural field. The sensors 420 may be visual sensors such as a camera, tactile sensors, or any other sensor type capable of detecting a plant. Sensors 420 are in electrical communication with computer 30 and/or microprocessor 35 such that readings from sensor 420 are communicated to computer 30 and/or microprocessor 35.

As shown in FIG. 5, a method 500 for determining emergence statistics begins at step 510 with providing an implement 20 configured to sense plants.

At step 520, seed location data is provided to computer 30 and/or microprocessor 35. Seed data may be collected as described in the section "Determining the precise location of each seed or plant." Alternatively, seed data may be collected by another method. Seed data comprises the location of each seed that was planted in the agricultural field to be assessed, and may comprise other information such as the seed variety or maps indicating the locations of rows in the field. Seed data may have been stored to computer 30 and/or microprocessor 35 during the planting operation. Alternatively seed data may be transferred to computer 30 and/or microprocessor 35 using a cable connected to another device or using removable storage such as an SD card.

At step 530, the implement 20 is pulled through an agricultural field in which seeds were previously planted and for which the seed data provided in step 520 pertains. Using the location data included in the seed data, the path of agricultural vehicle 10 is planned such that the wheels of agricultural vehicle 10 and the wheels and row units 410 of implement 20 will avoid driving over or striking plants, and the sensors 420 will travel through the rows of plants at a distance such that sensors 420 can determine if a plant is present at a location. As the agricultural vehicle 10 pulls implement 20 through the field, a series of seed locations will be determined, and a sensor 420 reading will be taken at each location to determine whether a plant emerged from each seed previously planted in the field.

At step 540, a sensor 420 travels within range of a location where a seed was previously planted. The location of the seed is determined by reading the precise latitude and longitude of the GPS unit 40 and adding an offset to the GPS location. The mounting location of a GPS unit 40 does not necessarily represent the precise location of the seed that was planted. The location of the planted seed is calculated by computer 30 or microprocessor 35 by adding offsets to the GPS location provided by GPS unit 40. The offsets are constant values representing the distance from the GPS unit 40 to the row unit of implement 20, and additional offset is added to compensate for the distance of sensor 420 from the seed location. Each row unit of implement 20 has its own set of unique offsets that, when added to the GPS location from GPS unit 40, represent the location of a seed adjacent to that row unit.

Simultaneously with traveling within range of a seed's location, at step 550 a sensor reading is taken. The sensor reading is indicative of whether a plant is present at the seed location. If the sensor reading indicates that a plant is present at the seed location, then at step 560 software running on microprocessor 35 or computer 30 stores additional seed data indicating that a plant emerged from the previously planted seed. Additionally at step 560, software running on microprocessor 35 or computer 30 increments both a seed counter indicative of the total number of seed locations encountered so far in the emergence calculating operation and a plant counter indicative of the total number of plants encountered so far in the emergence calculating operation. If the sensor reading indicates that a plant is not present at the seed location, then at step 570 software running on microprocessor 35 or computer 30 stores additional seed data indicating that no plant emerged from the previously planted seed. Additionally at step 570, software running on microprocessor 35 or computer 30 increments the seed counter only and does not increment the plant counter.

At step 580, ongoing emergence statistics may be displayed on computer 30. Alternatively, ongoing emergence statistics may be transmitted by computer 30 or microprocessor 35 to a remote observer. Emergence statistics may comprise the current status of the seed counter and plant counter variables, emergence percentage=plant counter/seed counter, or other statistics. If the emergence percentage is below a threshold, the operation may be paused and/or the remote observer may be alerted to determine if the agricultural vehicle 10 or implement 20 is off course or if another problem has occurred, causing incorrect emergence data to be collected.

Steps 530-580 are repeated continuously for each row unit on the implement 20 as long as the implement 20 is engaged in an emergence determining operation.

Determining Location Using Emergence Data

As shown in FIG. 6, a method 600 for determining location using emergence data begins at step 610 with providing an implement 20 configured to sense plants. The implement 20 may be as shown in FIG. 4 or may be any other type of implement configured to sense plants in a field.

At step 620, plant location data is provided to computer 30 and/or microprocessor 35. Plant data may be collected as described in the section "Determining emergence statistics." Alternatively, plant data may be collected by another method. Plant data comprises the location of each plant that emerged from a seed that was planted in the agricultural field, and may comprise other information such as the seed variety or maps indicating the locations of rows in the field. Plant data may have been stored to computer 30 and/or microprocessor 35 during another field operation. Alternatively plant data may be transferred to computer 30 and/or microprocessor 35 using a cable connected to another device or using removable storage such as an SD card.

At step 630, readings from a sensor 420 are taken until a first plant 430 is sensed. The time at which the first plant 430 is sensed is stored to computer 30 and/or microprocessor 35.

At step 640, readings from a sensor 420 are taken until a second plant 430 is sensed. The time at which the second plant 430 is sensed is stored to computer 30 and/or microprocessor 35. The second plant 430 may be the next consecutive plant encountered in the row after sensing the first plant 430. Alternatively, the first and second plants 430 may be non-consecutive plants 430 in the same row or plants 430 located in different rows.

At step 650, the distance between the first plant sensed at step 630 and the second plant sensed at step 640 is calculated using the speed of the agricultural vehicle 10 and the time elapsed between sensing the first plant and the second plant using the equation: distance=speed*time elapsed. Steps 630-650 are repeated for a number of consecutive plants (for example, the distance between a third sensed plant and the second plant is calculated, then the distance between a fourth and the third, etc.).

At step 670, the series of calculated distances from steps 630-650 is matched to the plant data. If a matching series of distances is found between the plant data and the distances calculated in steps 630-650, then at step 680 the location of the most recently sensed plant is retrieved from the plant data. Offsets may be subtracted from the retrieved location to compensate for the distance from sensor 420 and the GPS unit and indicate the location of the agricultural vehicle 10.

Steps 630-680 may be repeated as many times as necessary to determine the location of the agricultural vehicle 10 in the field.

When determining location using emergence data, it may be advantageous to measure the locations of multiple plants simultaneously. As shown in FIG. 20, an alternative method 600' for determining location using emergence data begins at step 610' with providing an implement 20 configured to sense plants. The implement 20 may be as shown in FIG. 4 or may be any other type of implement configured to sense plants in a field.

At step 620', plant location data is provided to computer 30 and/or microprocessor 35. Plant data may be collected as described in the section "Determining emergence statistics." Alternatively, plant data may be collected by another method. Plant data comprises the location of each plant that emerged from a seed that was planted in the agricultural field, and may comprise other information such as the seed variety or maps indicating the locations of rows in the field. Plant data may have been stored to computer 30 and/or microprocessor 35 during another field operation. Alternatively plant data may be transferred to computer 30 and/or microprocessor 35 using a cable connected to another device or using removable storage such as an SD card.

At step 630', a sensor 420 captures the relative locations of a plurality of plants 430 substantially simultaneously. In one embodiment, the locations of ten plants 430 are captured simultaneously, but the locations of any number of plants 430 may be captured without departing from the scope of the disclosure. The locations of the plants 430 may be sensed substantially simultaneously using LIDAR or a similar system. The locations of the sensed plants 430 are stored to computer 30 and/or microprocessor 35.

At step 670', the locations of the plants 430 sensed at step 630' are correlated with all of the plant 430 locations provided at step 620'. If a matching set of locations is found between the plant data and the locations measured at step 630', then at step 680' the location is retrieved from the plant data. Offsets may be subtracted from the retrieved location to compensate for the distance from sensor 420 and the GPS unit and indicate the location of the agricultural vehicle 10.

Steps 630'-680' may be repeated as many times as necessary to determine the location of the agricultural vehicle 10 in the field.

Detecting Wet Zones in an Agricultural Field Using Wheel Slippage

A method 700 for detecting wet zones in a field using wheel slippage begins at step 710 with providing an agricultural vehicle 10 equipped with a GPS unit 40 and a computer 30 and/or a microprocessor 35. Agricultural vehicle 10 may be a tractor pulling an implement 20, a harvester, a self-propelled sprayer, or other vehicle used for performing agricultural operations. Agricultural vehicle 10 may be a manned or unmanned vehicle; however, method 700 is particularly beneficial for autonomous operations in an agricultural field as the method 700 allows an agricultural vehicle 10 to determine when it is entering a wet zone without human intervention.

At step 720, the agricultural vehicle 10 is operated normally through the field. During normal operation, the agricultural vehicle 10 is typically driven from one end of the field to the other such that wheels and parts of any implement 20 generally do not crush, strike, or otherwise damage with the crops growing in the field. The agricultural vehicle 10 may be steered according to a mission plan loaded in computer 30, and operation of any implement 20 may be controlled by software running on computer 30 or microprocessor 35. For example, control software for implement 20 may control seeding rates of a planter, lifting or lowering of implement 20, flow rates of a sprayer, or any other operation of implement 20. During normal operation, the path of vehicle 10 may be dynamically altered due to changing conditions in any of the ways described in the section entitled, "Dynamic path planning."

While the agricultural vehicle 10 is operating, slippage is continually calculated at step 730 by software running on computer 30 or microprocessor 35. Computer 30 or microprocessor 35 reads the wheel-based speed from vehicle 10 and calculates a GPS-based speed from location information provided by GPS unit 40. The amount of slippage experienced by vehicle 10 is calculated using the equation: slippage=|(GPS-based speed−wheel-based speed)/GPS-based speed| where "| . . . |" indicates absolute value.

At step 740, if slippage does not exceed a predefined threshold over a predefined period of time, then the method 700 proceeds to step 720. Normal operations are continued and slippage continues to be calculated as long as slippage does not exceed the threshold for the given period of time. Experimental evidence has indicated that vehicle 10 may experience problems when slippage is equal to or greater than 0.25, indicating that the vehicle 10 is experiencing 25% slippage. Therefore, in one embodiment, the slippage threshold may be defined at 0.25; however, any other threshold may be specified without departing from the scope of the disclosure.

At step 750, if slippage is equal to or greater than the defined threshold for the defined period of time, then remedial measures are taken. In one embodiment, remedial measures may include raising the implement while slippage continues to be equal to or greater than the defined threshold. In another embodiment, remedial measures may include rerouting the vehicle or updating the mission plan to avoid driving through the wet zone. Once remedial measures have been implemented, the method proceeds to step 720.

Steps 720-750 are repeated as long as the vehicle 10 is engaged in an agricultural operation.

Detecting Wet Zones in an Agricultural Field Using Soil Contrast

When an agricultural vehicle 10 is operating in a field, soil contrast captured by a rear-facing camera 50 provides a good indication of when the vehicle 10 has entered a wet zone. In particular, tracks left by the wheels of vehicle 10 or implement 20 and ground engaging parts of implement 20 exhibit greater contrast compared to the surrounding soil when the ground is dry, and this contrast is reduced when a wet zone is encountered.

A method 800 for detecting wet zones in a field using soil contrast begins at step 810 with providing an agricultural vehicle 10 equipped with a GPS unit 40, a camera 50, and a computer 30 and/or a microprocessor 35. Agricultural vehicle 10 may be a tractor pulling an implement 20, a harvester, a self-propelled sprayer, or other vehicle used for performing agricultural operations. Agricultural vehicle 10 may be a manned or unmanned vehicle; however, the method 800 is particularly beneficial for autonomous operations in an agricultural field as the method 800 allows an agricultural vehicle 10 to determine when it is entering a wet zone without human intervention.

At step 820, the agricultural vehicle 10 is operated normally through the field. During normal operation, the agricultural vehicle 10 is typically driven from one end of the field to the other such that wheels and parts of any implement 20 generally do not crush, strike, or otherwise damage with the crops growing in the field. The agricultural vehicle 10 may be steered according to a mission plan loaded in computer 30, and operation of any implement 20 may be controlled by software running on computer 30 or microprocessor 35. For example, control software for implement 20 may control seeding rates of a planter, lifting or lowering of implement 20, flow rates of a sprayer, or any other operation of implement 20. During normal operation, the path of vehicle 10 may be dynamically altered due to changing conditions in any of the ways described in the section entitled, "Dynamic path planning."

While the agricultural vehicle 10 is operating, soil contrast is continually calculated at step 830 by software running on computer 30 or microprocessor 35. Computer 30 or microprocessor 35 receives an image captured by the camera 50 and performs image processing techniques to determine the amount of contrast between tracks and the surrounding soil. Contrast may be calculated using the equation: contrast=(highest intensity value in the image)−(lowest intensity value in the image). Further image processing techniques may be applied prior to calculating contrast to remove items that are commonly present in a field that would impact the contrast measurement. For example, crop debris such as corn stalks from a previous season could result in a high contrast calculation that falsely suggests that conditions are dry. Plant matter from the row crops being tended could produce similarly deceiving contrast calculations, and may also be removed from the image prior to calculating contrast.

At step 840, if contrast is greater than a defined threshold, then the method 800 proceeds to step 820. Normal operations are continued and contrast continues to be calculated as long as contrast continues to be greater than the defined threshold.

At step 850, if contrast is equal to or less than the defined threshold, then remedial measures are taken. In one embodiment, remedial measures may include raising the implement while contrast continues to be equal to or less than the threshold. In another embodiment, remedial measures may include rerouting the vehicle or updating the mission plan to avoid driving through the wet zone. Once remedial measures have been implemented, the method proceeds to step 820.

Steps 820-850 are repeated as long as the vehicle 10 is engaged in an agricultural operation.

Detecting Wet Zones in an Agricultural Field Using Soil Resistance

Soil's moisture content has an effect on the conductivity or resistance of the soil. As soil moisture increases, its conductivity increases and resistance decreases.

An apparatus 900 for measuring soil resistance comprises first and second coulter disks 910 that are mounted to an implement 20 such as a planter or tillage equipment. A positive side of a voltage source 920 connects to the first coulter disk 910 via a conductor 930, and a second side of a voltage source 920 connects to the second coulter disk 910 via a conductor 930. Voltage source 920 may be the battery of an agricultural vehicle 10 or a separate battery or voltage source. Conductor 930 may comprise wires or any other material capable of conducting electricity. Additionally, a positive side of a meter 940 connects to the first coulter disk 910 via a conductor 930, and a second side of a meter 940 connects to the second coulter disk 910 via a conductor 930. Meter 940 may be a voltmeter, multimeter, or other device capable of measuring voltage. When coulters 910 engage the soil, they effectively form a resistor with voltage source 920 and meter 940 each connected in parallel to the resistor. Voltage source 920 provides a known voltage and a known current to the formed circuit.

A method 1000 for detecting wet zones in a field using soil resistance begins at step 1010 with providing an agricultural vehicle 10 equipped with a computer 30 and/or a microprocessor 35 and an implement 20 equipped with an apparatus 900 for measuring soil resistance. Agricultural vehicle 10 may be a manned or unmanned vehicle; however, the method 1000 is particularly beneficial for autonomous operations in an agricultural field as the method 1000 allows an agricultural vehicle 10 to determine when it is entering a wet zone without human intervention.

At step 1020, the agricultural vehicle 10 is operated normally through the field. During normal operation, the agricultural vehicle 10 is typically driven from one end of the field to the other such that wheels and parts of implement 20 generally do not crush, strike, or otherwise damage with the crops growing in the field. The agricultural vehicle 10 may be steered according to a mission plan loaded in computer 30, and operation of any implement 20 may be controlled by software running on computer 30 or microprocessor 35. For example, control software for implement 20 may control seeding rates of a planter, lifting or lowering of implement 20, or any other operation of implement 20. During normal operation, the path of vehicle 10 may be dynamically altered due to changing conditions in any of the ways described in the section entitled, "Dynamic path planning."

While the agricultural vehicle 10 is operating, soil resistance is continually calculated at step 1030 by software running on computer 30 or microprocessor 35. Computer 30 or microprocessor 35 reads the voltage measurement registered across coulters 910. Resistance may be calculated using the equation: resistance=(voltage measured by meter 940)/(current).

At step 1040, if resistance is greater than a defined threshold, then the method 1000 proceeds to step 1020. Normal operations are continued and resistance continues to be calculated as long as resistance continues to be greater than the defined threshold. Alternatively, the voltage measured by the meter 940 could be used directly to indicate if the vehicle 10 and implement 20 have entered a wet zone. If the resistance across the coulter disks 910 is high, as in dry conditions, there should be a very low voltage drop across the coulter disks 910. In this case, at step 1040, if voltage is less than a defined voltage threshold, then the method 1000 proceeds to step 1020. Normal operations are continued and voltage continues to be measured as long as the voltage measured at meter 940 continues to be less than the defined voltage threshold.

At step 1050, if resistance is equal to or less than the defined threshold, then remedial measures are taken. Alternatively, the voltage measured by the meter 940 could be used directly to indicate if the vehicle 10 and implement 20 have entered a wet zone. If the resistance across the coulter disks 910 is low, as in wet conditions, there will be an increase in the voltage drop across the coulter disks 910. In this case, at step 1050, if voltage is equal to or greater than a defined voltage threshold, then remedial measures are taken. In one embodiment, remedial measures may include raising the implement while resistance continues to be equal to or less than the threshold. In another embodiment, remedial measures may include rerouting the vehicle or updating the mission plan to avoid driving through the wet zone. Once remedial measures have been implemented, the method proceeds to step 1020.

Steps 1020-1050 are repeated as long as the vehicle 10 is engaged in an agricultural operation.

In addition to providing information about soil moisture, soil resistance measurements could potentially be used to infer agronomic insights like soil fertility or organic content.

Tendering Seed, Chemicals, or Other Agricultural Inputs

On a typical agricultural planter, seeds to be planted are stored in one or more hoppers. From time to time during the planting operation, the amount of seed in at least one of the hoppers becomes low, and additional seed must be added in the field. Similarly, herbicides, pesticides, fuel, diesel exhaust fluid ("DEF"), fertilizer, and other chemicals or inputs are stored in hoppers or tanks on an agricultural vehicle 10 or implement 20 and must be replenished periodically as field operations progress. The term tendering refers to replenishing an agricultural input. Throughout this disclosure, the term agricultural input or simply "input" refers to seed, herbicide, pesticide, fuel, DEF, or any other agricultural chemical or input.

In an autonomous agricultural operation, it is necessary to identify the hybrid, variety, or chemical type of the input that is being tendered to avoid planting or applying the wrong input or applying an input incorrectly.

As shown in FIG. 12, a tendering station for replenishing agricultural inputs to an agricultural vehicle 10 or an implement 20 comprises a trailer 1210. Trailer 1210 is configured to transport agricultural vehicle 10 and/or an implement 20 from one work site to another. Trailer 1210 is also configured to transport one or more containers 1220.

Containers 1220 contain agricultural inputs needed to perform the intended operations planned for the field. A container 1220 may comprise a commercially available bulk box or seed pack. Alternatively, as shown in FIG. 13, container 1220 may comprise a hybrid seed pack 1220' which comprises a bulk box with two or more compartments 1225. Each compartment 1225 is configured to hold a different agricultural input. In one embodiment a hybrid seed pack 1220' is provided that contains enough fuel and other agricultural inputs to complete the operations intended for the field. For example, for a planting operation to be performed in a field, a hybrid seed pack 1220' with three compartments 1225 may be provided in which one compartment 1225 contains enough seed to complete the planting operation, another compartment 1225 contains enough starter fertilizer to complete the planting operation, and another compartment 1225 contains enough fuel to complete the planting operation.

Each container 1220 or compartment 1225 of a hybrid seed pack 1220' has an indicator 1230 that can be read by a sensor 60 secured to vehicle 10 or implement 20. Sensor 60 communicates with computer 30 or microprocessor 35 and is configured to read indicators 1230. Sensor 60 may comprise a camera configured to capture an image of a QR code, fiducial, or other visible indicator 1230. Alternatively, sensor 60 may comprise an RF reader configured to read an RF tag. Alternatively, sensor 60 may comprise another type of sensor configured to read an indicator 1230 that may be attached to a container 1220 or compartment 1225. Indicator 1230 may comprise a visible QR code, a three-dimensional fiducial, a Bluetooth beacon, or another type of sensor that can be read by sensor 60 to convey information about what type of input is contained in the container 1220 or compartment 1225. For example, indicator 1230 may contain information about the hybrid or variety of seed or the chemical type that is contained in the container 1220 or compartment 1225.

A method 1100 for automatically tendering agricultural inputs begins at step 1110 with providing an agricultural vehicle 10 equipped with a GPS unit 40, a sensor 60 configured to read an indicator on an input container, and a computer 30 and/or a microprocessor 35. Agricultural vehicle 10 may be a tractor pulling an implement 20, a harvester, a self-propelled sprayer, or other vehicle used for performing agricultural operations. Agricultural vehicle 10 may be a manned or unmanned vehicle; however, the method 1100 is particularly beneficial for autonomous operations in an agricultural field as the method 1100 allows an agricultural vehicle 10 to tender an input and determine the identity of the input without human intervention.

At step 1120, a tendering station 1200 is provided. Tendering station 1200 may be as previously described or may comprise another setup configured to provide inputs to vehicle 10 or implement 20. One or more containers 1220, each containing an agricultural input, and each having an indicator 1230 configured to be read by a sensor 60 is provided on tendering station 1220. The container 1220 may comprise bulk box or seed pack, which is an approximately 4'×4'×4' cube full of seed sold to large scale farmers by many seed companies. Alternatively, one or more hybrid seed packs 1220' as previously described may be provided.

At step 1130, the agricultural vehicle 10 is operated normally through the field. During normal operation, the agricultural vehicle 10 is typically driven from one end of the field to the other such that wheels and parts of any implement 20 generally do not crush, strike, or otherwise damage with the crops growing in the field. The agricultural vehicle 10 may be steered according to a mission plan loaded in computer 30, and operation of any implement 20 may be controlled by software running on computer 30 or microprocessor 35. For example, control software for implement 20 may control seeding rates of a planter, lifting or lowering of implement 20, flow rates of a sprayer, or any other operation of implement 20. Normal operation of vehicle 10 and implement 20 continues until a level of an input becomes low and needs to be replenished. During normal operation, the path of vehicle 10 may be dynamically altered due to changing conditions in any of the ways described in the section entitled, "Dynamic path planning."

At step 1140, software running on computer 30 or microprocessor 35 detects that a level of an agricultural input has fallen below a defined threshold. The threshold may be defined such that enough of the input remains to complete two rows or passes through the field; thus ensuring that the vehicle 10 can continue working until replenishing the low input rather than making an unproductive pass to the tendering station. By keeping the vehicle 10 working, the most efficient use of time and fuel can be made.

At step 1150, the vehicle 10 navigates to a tendering station 1200 where the low input will be replenished or tendered. The tendering station 1200 may comprise a trailer 1210 parked at one location in the field. The trailer 1210 may be used to transport the vehicle 10 and implement 20 between fields. The location of the tendering station 1200 may be recorded by the GPS unit 40 mounted to the vehicle 10 before the vehicle 10 is unloaded from the tendering station 1200. Alternatively, the location of the tendering station 1200 may be recorded the first time tendering is performed. Alternatively, the tendering station 1200 may have its own GPS unit 40 configured to determine the location of the tendering station 1200. Alternatively, a rough GPS location for the tendering station 1200 may be recorded and its precise location is determined as the vehicle 10 approaches the tendering station 1200 using imagery sensed by the vehicle 10 of a fiducial mounted to the tendering station 1200. If the threshold used in step 1140 is set appropriately, adequate inputs remain such that vehicle 10 and any implement 20 may complete the pass currently underway and then return to the tendering station 1200. For example, if the vehicle 10 is nearing the end of the field opposite to the tendering station 1200 when the low input alert occurs, then the vehicle 10 and implement 20 may continue working the current pass, turn at the end of the current pass, work the next pass, and then drive to the tendering station 1200. By doing so, the most efficient use of time and fuel is made. As the vehicle 10 approaches the tendering station 1200, input received by the sensor's 60 reading the indicator 1230 may be conveyed to navigation software running on computer 30 or microprocessor 35 to assist the vehicle 10 in accurately navigating to an appropriate location adjacent to the tendering station 1200.

At step 1160, the sensor 60 reads the indicator 1230. Container 1220 or hybrid/variety seed pack 1220' may be lifted onto the vehicle 10 or implement 20 in order for sensor 60 to be in proximity to indicator 1230 such that sensor 60 can read indicator 1230. When sensor 60 reads the indicator 1230, information encoded by or contained in indicator 1230 is communicated to software running on computer 30 or microprocessor 35, and the software determines if the input is the correct input type. For example, if the input detected as low at step 1140 was fuel, the software running on computer 30 or microprocessor 35 will determine if the input type indicated by indicator 1230 is fuel. If the correct input type was read by sensor 60, then the method 1100 proceeds to step 1170. If the incorrect input type was read by sensor 60, then the method 1100 returns to step 1150 and the vehicle attempts to approach the correct container 1220 or compartment 1225.

At step 1170, at least a portion of the contents of the container 1220 or compartment 1225 are loaded onto the vehicle 10 or implement 20. The contents of the container 1220 may be loaded using a connector configured to connect the container 1220 or compartment 1225 to the appropriate receptacle on the vehicle 10 or implement 20. Seed may be blown from the container 1220 or compartment 1225 into the implement 20 via the connector, and chemicals may be pumped from the container 1220 or compartment 1225 into the vehicle 10 or implement 20 via the connector. Alternatively, the container 1220 may take the form of a pack that can be loaded directly onto the vehicle 10 or implement 20 to provided inputs for the agricultural operation. After the input has been loaded, the method 1100 returns to step 1130, and the vehicle 10 and/or implement 20 are operated normally in the field. Steps 1130-1170 repeat until the field operation is complete.

Dynamic Path Planning

During a typical agricultural operation in a field, an agricultural vehicle 10 and/or implement 20 are driven from one end of the field to the other such that wheels and parts of any implement 20 generally do not crush, strike, or otherwise damage with the crops growing in the field. The agricultural vehicle 10 may be steered according to a predetermined mission plan loaded in computer 30, and operation of any implement 20 may be controlled by software running on computer 30 or microprocessor 35. For example, control software for implement 20 may control seeding rates of a planter, lifting or lowering of implement 20, flow rates of a sprayer, or any other operation of implement 20. At times it may be beneficial to dynamically change the path plan of vehicle 10 and/or implement 20 to accommodate for changing circumstances.

Dynamic Path Planning—Dynamically Changing Path to Conserve Inputs

During an agricultural operation, typically some passes through the field are more productive than others. For example, for oddly shaped fields the passes on the ends are usually shorter than the passes toward the center of the field, requiring more turn-arounds and resulting in less efficient operation of vehicle 10 and/or implement 20. In a situation where an input is running low but the tendering station 1200 is absent, the low input may run out before the tendering station 1200 arrives, particularly if operation continues in longer rows that can be worked more efficiently. At such a time, vehicle 10 and/or implement 20 may move to the shorter end rows, also known as point rows, or other rows that require more turn-arounds or are otherwise less efficient. By working less efficient rows at times when tendering is not a possibility, machine idle time is reduced, and overall efficiency of the operation is increased.

As shown in FIG. 14, a method 1400 of dynamically changing the path of a vehicle 10 to conserve or prolong the supply of one or more agricultural inputs begins at step 1410 with providing an agricultural vehicle 10 equipped with a GPS unit 40, a sensor 60 configured to read an indicator on an input container, and a computer 30 and/or a microprocessor 35. Agricultural vehicle 10 may be a tractor pulling an implement 20, a harvester, a self-propelled sprayer, or other vehicle used for performing agricultural operations. Agricultural vehicle 10 may be a manned or unmanned vehicle; however, the method 1400 is particularly beneficial for autonomous operations in an agricultural field as the method 1400 allows an agricultural vehicle 10 to operate without human intervention.

At step 1420, a tendering station 1200 is provided. Tendering station 1200 may be as previously described, or may comprise another setup configured to provide inputs to vehicle 10 or implement 20. One or more containers 1220, each containing an agricultural input, and each having an indicator 1230 configured to be read by a sensor 60 is provided on tendering station 1220. The container 1220 may comprise bulk box or seed pack, which is an approximately 4'×4'×4' cube full of seed sold to large scale farmers by many seed companies. Alternatively, one or more hybrid seed packs 1220' as previously described may be provided.

At step 1430, the vehicle 10 is operated normally through the field. Step 1430 proceeds substantially similarly to step 1130 of method 1100.

At step 1440, a low level of an agricultural input is detected. Step 1440 proceeds substantially similarly to step 1140 of method 1100.

At step 1445, software running on computer 30 or microprocessor 35 determines whether the tendering station 1200 is present in the field. If computer 30 or microprocessor detects that the tendering station 1200 is present, then the method 1400 proceeds to step 1450. If computer 30 or microprocessor detects that the tendering station 1200 is absent, then the method 1400 proceeds to step 1447 in which software identifies passes that require more turn-arounds than typical or are otherwise less efficient, navigates vehicle 10 and/or implement 20 to the location of the less efficient rows, and works the less efficient rows until supply of the low input is exhausted, until the less efficient rows have been worked, or until the tendering station 1200 arrives, whichever occurs first. By keeping the vehicle 10 working as much as possible, the most efficient use of time can be made.

At step 1450, the vehicle 10 navigates to a tendering station 1200 where the low input will be replenished or tendered. Step 1450 proceeds substantially similarly to step 1150 of method 1100.

At step 1460, the sensor 60 reads the indicator 1230. Step 1460 proceeds substantially similarly to step 1160 of method 1100.

At step 1470, at least a portion of the contents of the container 1220 or compartment 1225 are loaded onto the vehicle 10 or implement 20. After the input has been loaded, the method 1400 returns to step 1430, and the vehicle 10 and/or implement 20 are operated normally in the field. Steps 1430-1470 repeat until the field operation is complete.

A path plan may be dynamically changed based on the location of the tendering station 1200, causing the vehicle 10 to modify its plan to work on passes to reduce the amount of time required to traverse its location to the tendering station 1200. For example, if vehicle 10 and implement 20 are planting long rows to the south and the tendering station 1200 is on the north side, there may not be enough seed to complete two long passes on the south side. However, there may be enough seed to do a number of shorter passes on the north side. The path of vehicle 10 and implement 20 may be changed dynamically to head to the north passes and do a couple rounds there near the tendering station 1200.

Dynamic Path Planning—Dynamically Changing Path to Improve Safety

As shown in FIG. 15, a method 1500 of dynamically changing the path of a vehicle 10 to improve safety begins at step 1510 with providing an agricultural vehicle 10 equipped with a GPS unit 40, an obstacle detection system 70 configured to detect people or objects in the path of or near vehicle 10, and a computer 30 and/or a microprocessor 35. Agricultural vehicle 10 may be a tractor pulling an implement 20, a harvester, a self-propelled sprayer, or other vehicle used for performing agricultural operations. Obstacle detection system 70 may comprise any combination of sensors and software running on computer 30 or microprocessor 35 configured to detect people or objects in the path of or near vehicle 10 or implement 20. Agricultural vehicle 10 may be a manned or unmanned vehicle; however, the method 1500 is particularly beneficial for autonomous operations in an agricultural field as the method 1500 allows an agricultural vehicle 10 to operate without human intervention.

At step 1520, the vehicle 10 is operated normally through the field. Step 1520 proceeds substantially similarly to step 1130 of method 1100.

At step 1530, the obstacle detection system 70 determines whether there are any people or other obstacles in the path of or near vehicle 10 or implement 20. If the obstacle detection system 70 detects that there are no people or other obstacles, then the method 1500 proceeds to step 1520 and normal operation of the vehicle 10 and/or implement 20 continues. If the obstacle detection system 70 detects a person or other obstacle in the path of or near vehicle 10 or implement 20, then the method 1500 proceeds to step 1540 in which software running on computer 30 or microprocessor 35 identifies unworked passes that are an adequate distance from the detected obstacle and navigates vehicle 10 and/or implement 20 to the location of the first of the identified rows. The method 1500 then returns to step 1520, and normal operation resumes in the new location. Passes are completed in an order that takes vehicle 10 and/or implement 20 away from the detected obstacle. By moving away from the obstacle, the vehicle 10 and implement 20 remain working as much as possible to make the most efficient use of time possible while avoiding injury to nearby people and damage to equipment.

Steps 1520-1540 repeat as needed until the field operation is complete. After some time has passed, vehicle 10 will return to work the location where the obstacle was previously detected. If the obstacle remains, human intervention may be required to remove the obstacle, and the vehicle 10 and implement 20 will pause operating until the obstacle can be cleared.

Dynamic Path Planning—Dynamically Changing Path to Reduce Disrupting Noise

Agricultural operations can create a lot of noise that can be disruptive to homes and businesses near the field where the operations are taking place. When an agricultural vehicle 10 and or implement 20 are operating near homes, those operations are ideally performed in the late morning or in the afternoon to increase the chances that residents are awake and away from home when the most disruptive operations are occurring. When an agricultural vehicle 10 and or implement 20 are operating near businesses, those operations are ideally performed in the evening or overnight to avoid disruptive operations during business hours.

As shown in FIG. 16, a method 1600 of dynamically changing the path of a vehicle 10 to reduce disrupting noise begins at step 1610 with providing an agricultural vehicle 10 equipped with a GPS unit 40, and a computer 30 and/or a microprocessor 35. Maps indicating the locations of homes, businesses, residential zoning, industrial zoning, or other types of zoning indicative of homes or businesses may be preloaded on computer 30 and/or microprocessor 35. Agricultural vehicle 10 may be a tractor pulling an implement 20, a harvester, a self-propelled sprayer, or other vehicle used for performing agricultural operations. Agricultural vehicle 10 may be a manned or unmanned vehicle; however, the method 1600 is particularly beneficial for autonomous operations in an agricultural field as the method 1600 allows an agricultural vehicle 10 to operate without human intervention.

At step 1620, the vehicle 10 is operated normally through the field. Step 1620 proceeds substantially similarly to step 1130 of method 1100.

At step 1630, before beginning a new pass through the field, software running on computer 30 or microprocessor 35 determines whether any homes or businesses on preloaded maps are within a defined distance threshold of the planned pass. If the pass keeps the vehicle 10 and/or implement 20 a distance from any home or business that is greater than the threshold, then no additional noise disruption is predicted, the method 1600 returns to step 1620, and normal operation continues. If the pass will put the vehicle 10 and/or implement 20 at a distance from a home or business that is less than or equal to the threshold, then noise disruption to the home or business is predicted, and the method 1600 proceeds to step 1640.

At step 1640, the software running on computer 30 or microprocessor 35 reads the time available from vehicle 10, computer 30, microprocessor 35, GPS unit 40, or another reliable source (i.e., a source that is set automatically rather than relying on a human operator to set the time.) If the structure that will be impacted by the noise is a home, and the time is within a defined daytime range (for example, between 10 am and 4:30 pm), then people are more likely to be awake and out of the home, the method 1600 returns to step 1620, and normal operation proceeds. If the structure that will be impacted by the noise is a home, and the time is outside the defined daytime range, then people are more likely to be at home and bothered by disruptive noise, and the method 1600 proceeds to step 1650. If the structure that will be impacted by the noise is a business, and the time is within a defined nighttime range (for example, between 9:00 pm and 5:00 am), then the business is more likely to be closed, the method 1600 returns to step 1620, and normal operation proceeds. If the structure that will be impacted by the noise is a business, and the time is outside the defined nighttime range, then the business is more likely to be open and subject to disruptive noise, and the method 1600 proceeds to step 1650.

At step 1650, software running on computer 30 or microprocessor 35 identifies unworked passes that are an adequate distance from the detected home or business and navigates vehicle 10 and/or implement 20 to the location of the first of the identified rows. The method 1600 then returns to step 1620, and normal operation resumes in the new location. Passes are completed in an order that takes vehicle 10 and/or implement 20 away from the detected home or business. By moving away from the home or business, the vehicle 10 and implement 20 remain working as much as possible to make the most efficient use of time possible while avoiding disruption to nearby homes and businesses.

Steps 1620-1650 repeat as needed until the field operation is complete. After some time has passed, vehicle 10 will return to work the location where the home or business was previously detected. If the time is still outside of the ideal range for the structure type and the vehicle 10 and/or implement 20 is planned to remain at the work location until a time that is within the appropriate range, then vehicle 10 and/or implement 20 may pause work until the appropriate time range.

Dynamic Path Planning—Dynamically Changing Path to Delay Operations in Wet Zones As shown in FIG. 17, a method 1700 of dynamically changing the path of a vehicle 10 to avoid wet zones begins at step 1710 with providing an agricultural vehicle 10 equipped with a GPS unit 40, and a computer 30 and/or a microprocessor 35. Agricultural vehicle 10 may be a tractor pulling an implement 20, a harvester, a self-propelled sprayer, or other vehicle used for performing agricultural operations. Software running on computer 30 or microprocessor 35 is configured to detect wet zones in the field while operating. Wet zones may be detected using any of methods 700, 800, or 100 or another method for detecting wet zones. Further, agricultural vehicle 10 may be equipped with an apparatus 900 or another system for detecting wet zones. Agricultural vehicle 10 may be a manned or unmanned vehicle; however, the method 1700 is particularly beneficial for autonomous operations in an agricultural field as the method 1700 allows an agricultural vehicle 10 to operate without human intervention.

At step 1720, the vehicle 10 is operated normally through the field. Step 1720 proceeds substantially similarly to step 1130 of method 1100.

At step 1730, whether the vehicle 10 and/or implement 20 is operating in a wet zone is detected. Wet zones may be detected using any of methods 700, 800, or 100 or another method for detecting wet zones. Further, wet zones may be detected with an apparatus 900 or another system for detecting wet zones. If no wet zone is detected, then the method 1700 proceeds to step 1720 and normal operation of the vehicle 10 and/or implement 20 continues. If a wet zone is detected, then the method 1700 proceeds to step 1740 in which software running on computer 30 or microprocessor 35 identifies unworked passes that are an adequate distance from the detected wet zone and navigates vehicle 10 and/or implement 20 to the location of the first of the identified rows. The method 1700 then returns to step 1720, and normal operation resumes in the new location. Passes are completed in an order that takes vehicle 10 and/or implement 20 away from the detected wet zone. By moving away from the wet zone, the vehicle 10 and implement 20 remain working as much as possible to make the most efficient use of time possible while avoiding becoming stuck.

Steps 1720-1740 repeat as needed until the field operation is complete. After some time has passed, vehicle 10 will return to work the location where the wet zone was previously detected. If no precipitation has fallen since the vehicle 10 was rerouted, the wet zone may have had time to dry up enough for operations to proceed through the previously wet area. If the wet zone remains and the vehicle 10 and/or implement will remain in the area for some time, then operations may pause for as long as possible to give the wet zone additional time to dry up and still complete the planned operations; however, if precipitation is predicted then operations in the wet zone may be skipped to avoid potentially trapping the vehicle 10 and/or implement 20 in an enlarged wet zone.

Planting End Rows

In a typical agricultural planting operation, the majority of the field is the "interior portion," which consists of seeds planted in rows that stretch nearly from one end of the field to the other end. Some space is required at the ends of the rows for the vehicle and planter to turn around. The turn-around area of the field is planted as "end rows," which are passes that traverse around the outermost perimeter of the field. The end rows planted in the turn-around area are often generally perpendicular to the rows planted in the interior.

Most farmers plant the end rows first, and then plant the interior. Historically they did this as a guide to indicate when the planter must be lowered at the beginning of an interior row or raised at the end of an interior row. With the advent of precision agriculture, the planting manager running on a computer 30 or microprocessor 35 retains the end row locations and uses them as a guide as to when to turn on and turn off a row.

Quite often the outer end row is the only hazard in a field. Throughout the year, fence posts fall, trees fall, and fencing wire sags and drifts. Moreover, farmers' boundary files for a field are often in error as they typically use a coarse web-based application or inaccurate information from a GPS receiver to create them. An autonomous system could be used to first plant the outermost end row and record the accurate GPS position while planting. The accurate GPS coordinates recorded while planting this first end row can then be used to autonomously plant the remaining end rows and interior portion. Because the autonomous system knows the field boundary and the amount of space needed to turn the vehicle 10 and implement 20 around, it is cognizant of the location when the row needs to be turned on and off without planting the end rows first. End rows can be planted last with the advantages of avoiding berming and disturbance of the seed bed that can happen when the vehicle 10 and implement 20 turn around.

A method 1800 for planting end rows in an agricultural field begins at step 1810 with providing an agricultural vehicle 10 equipped with a GPS unit 40, and a computer 30 and/or a microprocessor 35. Agricultural vehicle 10 is typically a tractor pulling an implement 20 wherein implement 20 is an agricultural planter configured to plant seeds in the soil. Agricultural vehicle 10 may be a manned or unmanned vehicle; however, the method 1800 is particularly beneficial for autonomous operations in an agricultural field as the method 1800 as the visual information end rows provide is not needed by autonomous agricultural equipment.

At step 1820, the outermost end row pass in the field is planted. The outermost end row pass is the pass closest to the field perimeter. Contemporaneously with planting this outermost end row pass, accurate GPS coordinates provided by the GPS unit 40 are communicated to and recorded by computer 30 or microprocessor 35.

Once the outermost end row is planted and GPS coordinates recorded, software running on computer 30 or microprocessor 35 creates a mission plan in which the locations of interior rows and end rows to be planted are determined as well as the order in which the rows will be planted. At step 1830, the interior rows of the field are planted according to the mission plan.

Once all interior rows are planted, at step 1840 the remaining end rows are planted according to the mission plan.

At any point during the planting process, changed circumstances may cause the navigation software running on computer 30 or microprocessor 35 to dynamically alter the path of the vehicle 10 and implement 20 in accordance with any of the methods described in the section entitled "Dynamic path planning" or by another dynamic path planning method.

Planting Multiple Hybrids or Varieties

To maximize yield despite the variety of soil types and conditions, different hybrids or varieties of seed may be planted throughout a single agricultural field based on varying conditions within that field. For example, a drought resistant variety may be planted in drier areas of a field only and another variety planted in the remaining areas of the field. Many manufacturers of agricultural equipment produce multi-hybrid seed meters with multiple seed delivering mechanisms that are capable of automatically switching from planting one variety of seed to another during a planting operation.

A method 1900 for planting multiple hybrids or varieties in an agricultural field begins at step 1910 with providing an agricultural vehicle 10 equipped with a GPS unit 40, and a computer 30 and/or a microprocessor 35. Agricultural vehicle 10 is typically a tractor pulling an implement 20 wherein implement 20 is an agricultural planter configured to plant seeds in the soil. Agricultural vehicle 10 may be a manned or unmanned vehicle. Software running on computer 30 or microprocessor 35 contains a mission plan indicating GPS coordinates at which two or more hybrids or varieties of seed are to be planted in the field. For example, a first hybrid or variety may be planted at various locations identified by GPS coordinates in the mission plan, and a second hybrid or variety may be planted at other locations identified by GPS coordinates in the mission plan. Any desired number of hybrids or varieties may be planted in a single field.

At step 1920, all areas indicated in the mission plan for planting with a first hybrid or variety of seed are planted. Prior to planting the first variety, seed hoppers on implement 20 are filled seed of the first variety, and any chemicals such as starter fertilizer that are required are loaded in separate hoppers. If less than a full hopper's worth of seed or chemical are required to complete planting the first variety, then the hoppers may be filled with only an amount calculated to be sufficient to complete planting of the first variety. By loading only the required amount, the issue of emptying unused seed from the hoppers while changing varieties is avoided.

At step 1930, software running on computer 30 or microprocessor 35 determines if any additional hybrids or varieties of seed remain to be planted. If no hybrids/varieties remain to be planted, then the planting operation is complete, and vehicle 10 and implement 20 may move to a location for transport to the next work location. If at least one more hybrid/variety remains to be planted, then the method 1900 proceeds to step 1940.

At step 1940, all areas indicated in the mission plan for planting with the next hybrid or variety of seed are planted. This hybrid/variety may be planted by the same vehicle 10 and implement 20 that planted other hybrids/varieties, or multiple vehicles 10 and implements 20 may operate in the field planting different varieties. Prior to planting this hybrid/variety, seed hoppers on implement 20 are filled seed of this hybrid/variety, and any chemicals such as starter fertilizer that are required are loaded in separate hoppers. If less than a full hopper's worth of seed or chemical are required to complete planting this hybrid/variety, then the hoppers may be filled with only an amount calculated to be sufficient to complete planting of this hybrid/variety. By loading only the required amount, the issue of emptying unused seed from the hoppers while changing varieties is avoided.

Steps 1930 and 1940 repeat until all varieties to be planted in the field have been planted according to the mission plan. At any point during the planting process, changed circumstances may cause the navigation software running on computer 30 or microprocessor 35 to dynamically alter the path of the vehicle 10 and implement 20 in accordance with any of the methods described in the section entitled "Dynamic path planning" or by another dynamic path planning method.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for determining a location of a seed planted in an agricultural field comprising:
   providing an agricultural planter equipped with a GPS receiver;
   moving the agricultural planter through the agricultural field;
   depositing the seed in the agricultural field via a row unit of the agricultural planter and determining a location of the GPS receiver as the seed is deposited;
   applying an offset to the location to determine an adjusted location representing the location of the planted seed in the agricultural field;
   storing the adjusted location;
   repeating the steps of moving the agricultural planter through the agricultural field, depositing the seed in the agricultural field via a row unit of the agricultural planter and determining the location of the GPS receiver as the seed is deposited, applying an offset to the location to determine an adjusted location representing the location of the planted seed in the agricultural field, and storing the adjusted location for each of a plurality of seeds planted in the agricultural field, thus creating an as-planted seed data set containing the adjusted location for each individual seed planted in the agricultural field and retrievable for use with a subsequent operation in the agricultural field; and
   providing in a subsequent operation in the agricultural field an implement equipped with a sensor; loading the as-planted seed data set;
   steering the implement such that the sensor is adjacent to the adjusted location from the as-planted seed data set;
   reading the sensor adjacent to the adjusted location to obtain a sensor reading; storing plant presence data if the sensor reading is indicative of a plant located at the adjusted location; and
   storing plant absence data if the sensor reading is indicative of no plant located at the adjusted location.

2. The method of claim 1 further comprising storing a hybrid or variety of the seed.

3. The method of claim 1 further comprising repeating the steps of steering the implement such that the sensor is adjacent to the adjusted location; reading the sensor at adjacent to the adjusted location to obtain a sensor reading; storing plant presence data if the sensor reading is indicative of a plant located at the adjusted location; and storing plant absence data if the sensor reading is indicative of no plant located at the adjusted location to obtain plant location data for a plurality of plants.

4. The method of claim 1 further comprising sensing presence of a plurality of plants in a subsequent trip through the agricultural field, calculating distances between each of the plurality of plants to obtain calculated distances, matching the calculated distances to a set of matching distances in the plant location data, and retrieving a location from the plant location data.

* * * * *